United States Patent
Wang et al.

(10) Patent No.: US 9,967,729 B2
(45) Date of Patent: May 8, 2018

(54) TRANSMISSION AND RECEPTION OF PROXIMITY DETECTION SIGNAL FOR PEER DISCOVERY

(71) Applicant: QUALCOMM Incorporated, San Diego, CA (US)

(72) Inventors: Renqiu Wang, San Diego, CA (US); Siddhartha Mallik, San Diego, CA (US); Ravi Palanki, Cupertino, CA (US); Naga Bhushan, San Diego, CA (US); Tao Luo, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/264,236

(22) Filed: Sep. 13, 2016

(65) Prior Publication Data
US 2017/0006458 A1   Jan. 5, 2017

Related U.S. Application Data

(62) Division of application No. 13/085,337, filed on Apr. 12, 2011, now Pat. No. 9,485,069.
(Continued)

(51) Int. Cl.
*H04W 8/00* (2009.01)
*H04L 5/00* (2006.01)
(Continued)

(52) U.S. Cl.
CPC ........... *H04W 8/005* (2013.01); *H04L 5/0053* (2013.01); *H04L 67/104* (2013.01); *H04W 4/02* (2013.01);
(Continued)

(58) Field of Classification Search
CPC .... H04L 5/0053; H04L 67/104; H04W 8/005; H04W 4/02; H04W 56/0025;
(Continued)

(56) References Cited

U.S. PATENT DOCUMENTS 8,385,316 B2   2/2013  Laroia et al.
8,923,423 B2 * 12/2014  Molnar ................ H04B 7/0417
                                              375/267
(Continued)

FOREIGN PATENT DOCUMENTS

CN            1536925 A      10/2004
CN          101690038 A       3/2010
(Continued)

OTHER PUBLICATIONS

3GPP TS 36.211, "3rd Generation Partnership Project; Technical Specification Group Radio Access Network; Evolved Universal Terrestrial Radio Access (E-UTRA) Physical Channels and Modulation (Release 9)", (Mar. 31, 2010), pp. 1-85, V9.1.0.
(Continued)

*Primary Examiner* — Gregory Sefcheck
*Assistant Examiner* — Majid Esmaeilian
(74) *Attorney, Agent, or Firm* — Arent Fox, LLP

(57) ABSTRACT

Techniques for performing peer discovery to enable peer-to-peer (P2P) communication are disclosed. In an aspect, a proximity detection signal used for peer discovery may be generated based on one or more physical channels and/or signals used in a wireless network. In one design, a user equipment (UE) may generate a proximity detection signal occupying at least one resource block based on a SC-FDMA modulation technique. In another design, the UE may generate a proximity detection signal occupying at least one resource block based on an OFDMA modulation technique. The UE may generate SC-FDMA symbols or OFDMA
(Continued)

symbols in different manners for different physical channels. In yet another design, the UE may generate a proximity detection signal including a primary synchronization signal and a secondary synchronization signal. For all designs, the UE may transmit the proximity detection signal to indicate its presence and to enable other UEs to detect the UE.

19 Claims, 14 Drawing Sheets

Related U.S. Application Data

(60) Provisional application No. 61/324,619, filed on Apr. 15, 2010, provisional application No. 61/327,604, filed on Apr. 23, 2010.

(51) Int. Cl.
| | |
|---|---|
| *H04W 56/00* | (2009.01) |
| *H04L 29/08* | (2006.01) |
| *H04W 4/02* | (2018.01) |
| *H04W 72/04* | (2009.01) |
| *H04W 72/00* | (2009.01) |
| *H04W 92/18* | (2009.01) |

(52) U.S. Cl.
CPC ..... *H04W 56/002* (2013.01); *H04W 56/0025* (2013.01); *H04W 72/0453* (2013.01); *H04W 72/00* (2013.01); *H04W 76/10* (2018.02); *H04W 92/18* (2013.01)

(58) Field of Classification Search
CPC ........... H04W 56/002; H04W 72/0453; H04W 72/00; H04W 76/02; H04W 92/18
USPC ........................................................ 370/344
See application file for complete search history.

(56) References Cited

U.S. PATENT DOCUMENTS

| | | | | |
|---|---|---|---|---|
| 8,938,197 | B2* | 1/2015 | Zhou ................... | H04B 7/2606 455/13.1 |
| 2003/0169702 | A1* | 9/2003 | Ryu ................... | H04B 1/70735 370/320 |
| 2007/0121484 | A1 | 5/2007 | Kim et al. | |
| 2009/0016255 | A1 | 1/2009 | Park | |
| 2009/0016353 | A1 | 1/2009 | Li et al. | |
| 2009/0180435 | A1* | 7/2009 | Sarkar ....................... | H04L 5/14 370/330 |
| 2009/0323648 | A1 | 12/2009 | Park et al. | |
| 2010/0008317 | A1* | 1/2010 | Bhattad ................. | H04L 1/0003 370/329 |
| 2010/0027692 | A1* | 2/2010 | Kent ..................... | H04L 5/0007 375/260 |
| 2010/0034077 | A1 | 2/2010 | Ishii et al. | |
| 2010/0097978 | A1* | 4/2010 | Palanki ................ | H04B 7/2606 370/315 |
| 2010/0104034 | A1* | 4/2010 | Nam ..................... | H04L 5/0007 375/260 |
| 2010/0165882 | A1 | 7/2010 | Palanki et al. | |
| 2010/0167743 | A1 | 7/2010 | Palanki et al. | |
| 2010/0195604 | A1 | 8/2010 | Papasakellariou et al. | |
| 2010/0222062 | A1* | 9/2010 | Chou .................... | H04W 16/14 455/449 |
| 2010/0238847 | A1* | 9/2010 | Suo ....................... | H04B 7/2643 370/280 |
| 2010/0260154 | A1 | 10/2010 | Frank et al. | |
| 2010/0290426 | A1 | 11/2010 | Guey et al. | |
| 2010/0323633 | A1* | 12/2010 | Pani ....................... | H04W 24/10 455/67.14 |
| 2011/0098070 | A1* | 4/2011 | Han ..................... | H04J 11/0079 455/507 |
| 2011/0105112 | A1 | 5/2011 | Cave et al. | |
| 2011/0164604 | A1* | 7/2011 | Hao ..................... | H04L 27/2626 370/345 |
| 2011/0170496 | A1* | 7/2011 | Fong ..................... | H04L 5/0053 370/329 |
| 2011/0191187 | A1 | 8/2011 | Charbit et al. | |
| 2011/0194501 | A1* | 8/2011 | Chung .................. | H04L 5/0053 370/328 |
| 2011/0205954 | A1* | 8/2011 | Gorokhov ............. | H04L 5/0007 370/315 |
| 2011/0268101 | A1* | 11/2011 | Wang .................... | H04L 5/0053 370/344 |
| 2011/0292895 | A1 | 12/2011 | Wager et al. | |
| 2011/0305179 | A1* | 12/2011 | Wang ..................... | H04L 1/0031 370/311 |

FOREIGN PATENT DOCUMENTS

| | | |
|---|---|---|
| EP | 2012479 A1 | 1/2009 |
| JP | 2008028445 A | 2/2008 |
| WO | WO-2009009314 A1 | 1/2009 |
| WO | WO-2009009362 A1 | 1/2009 |
| WO | WO-2009009364 A1 | 1/2009 |
| WO | WO-2009158663 A1 | 12/2009 |
| WO | WO-2010078271 A2 | 7/2010 |

OTHER PUBLICATIONS

International Preliminary Report on Patentability—PCT/US2011/032686, The International Bureau of WIPO—Geneva, Switzerland, Jun. 15, 2012.
International Search Report & Written Opinion—PCT/US2011/032686, International Search Authority—European Patent Office—Sep. 29, 2009.

* cited by examiner

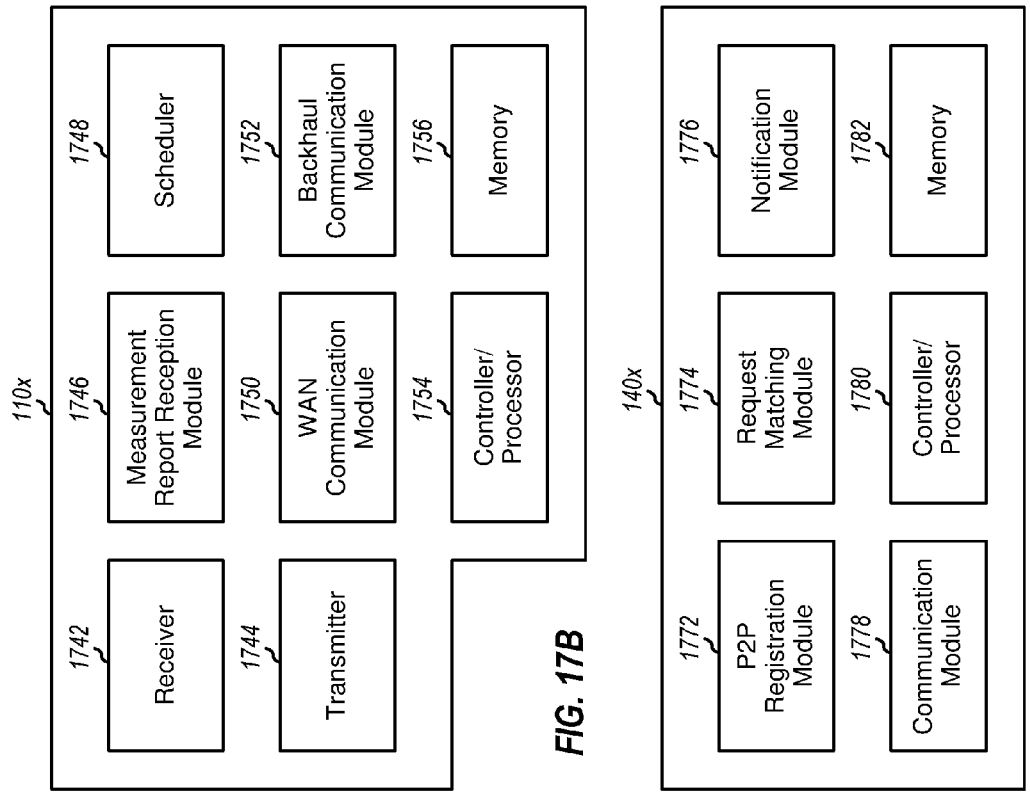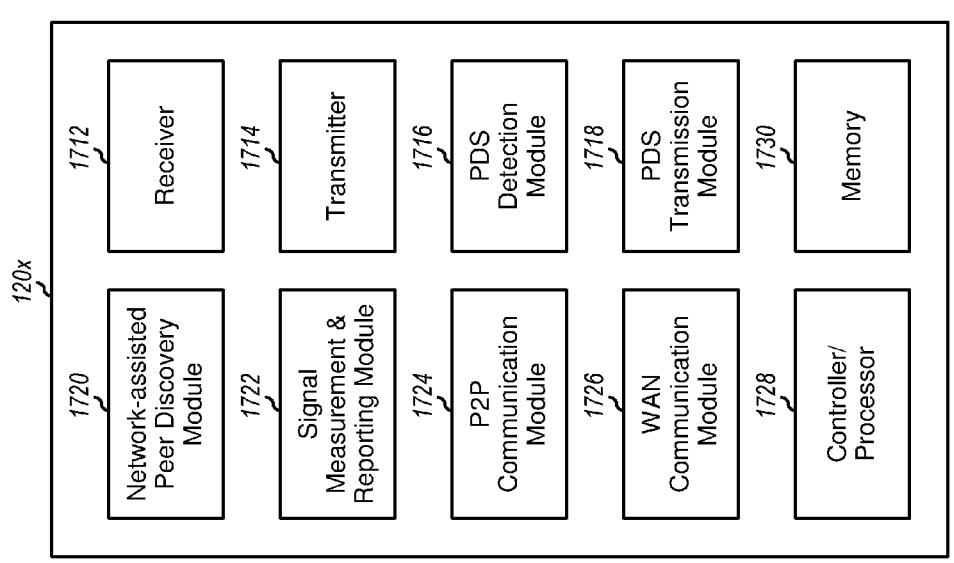
FIG. 17A
FIG. 17B
FIG. 17C

TRANSMISSION AND RECEPTION OF PROXIMITY DETECTION SIGNAL FOR PEER DISCOVERY

The present application is a division of U.S. patent application Ser. No. 13/085,337 filed on Apr. 12, 2011, now U.S. Pat. No. 9,485,069 which claims priority to provisional U.S. Application Ser. No. 61/324,619, entitled "PILOT OPTIONS FOR PEER-TO-PEER (P2P) DISCOVERY," filed Apr. 15, 2010, and provisional U.S. Application Ser. No. 61/327,604, entitled "PEER-TO-PEER PROXIMITY DETECTION SIGNAL DESIGN AND UTILIZATION THEREOF," filed Apr. 23, 2010, all of the above incorporated herein by reference in their entirety.

BACKGROUND

I. Field

The present disclosure relates generally to communication, and more specifically to techniques for supporting peer-to-peer (P2P) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may also be able to communicate peer-to-peer with one or more other UEs. It may be desirable to efficiently support P2P communication for UEs.

SUMMARY

Techniques for performing peer discovery to enable P2P communication are described herein. In an aspect, a proximity detection signal used for peer discovery may be generated based on one or more physical channels and/or signals used in a wireless network. These physical channels and signals may be designed to have good performance for WAN communication and may thus provide good performance for peer discovery.

In one design, a UE may select at least one resource block from among a plurality of resource blocks reserved for transmission of proximity detection signals by UEs. Each resource block may cover a set of subcarriers in a plurality of symbol periods. The UE may generate a proximity detection signal occupying the at least one resource block based on a SC-FDMA modulation technique, e.g., for transmission on a Physical Uplink Shared Channel (PUSCH) or a Physical Uplink Control Channel (PUCCH). The UE may generate the at least one SC-FDMA symbol in different manners for the PUSCH and PUCCH, as described below. The UE may transmit the proximity detection signal to indicate its presence and to enable other UEs to detect the UE.

In another design, a UE may generate a proximity detection signal occupying at least one resource block based on an OFDMA modulation technique, e.g., for transmission on a Physical Downlink Shared Channel (PDSCH) or a Physical Downlink Control Channel (PDCCH). The UE may generate the plurality of OFDM symbols in different manners for the PDSCH and PDCCH, as described below. The UE may transmit the proximity detection signal to indicate its presence and to enable other UEs to detect the UE.

In yet another design, a UE may generate a proximity detection signal comprising a primary synchronization signal (PSS) and a secondary synchronization signal (SSS). The UE may transmit the proximity detection signal to indicate its presence. The UE may generate and/or transmit the proximity detection signal such that the PSS and SSS in the proximity detection signal avoid collision with the PSS and SSS transmitted by a base station in a wireless network. This may be achieved in various manners as described below. The PSS and SSS transmitted by the UE may then be distinguishable from the PSS and SSS transmitted by the base station.

Various aspects and features of the disclosure are described in further detail below.

BRIEF DESCRIPTION OF THE DRAWINGS

FIG. 17A shows a block diagram of a design of a UE.

FIG. 17B shows a block diagram of a design of a base station.

FIG. 17C shows a block diagram of a design of a directory agent.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
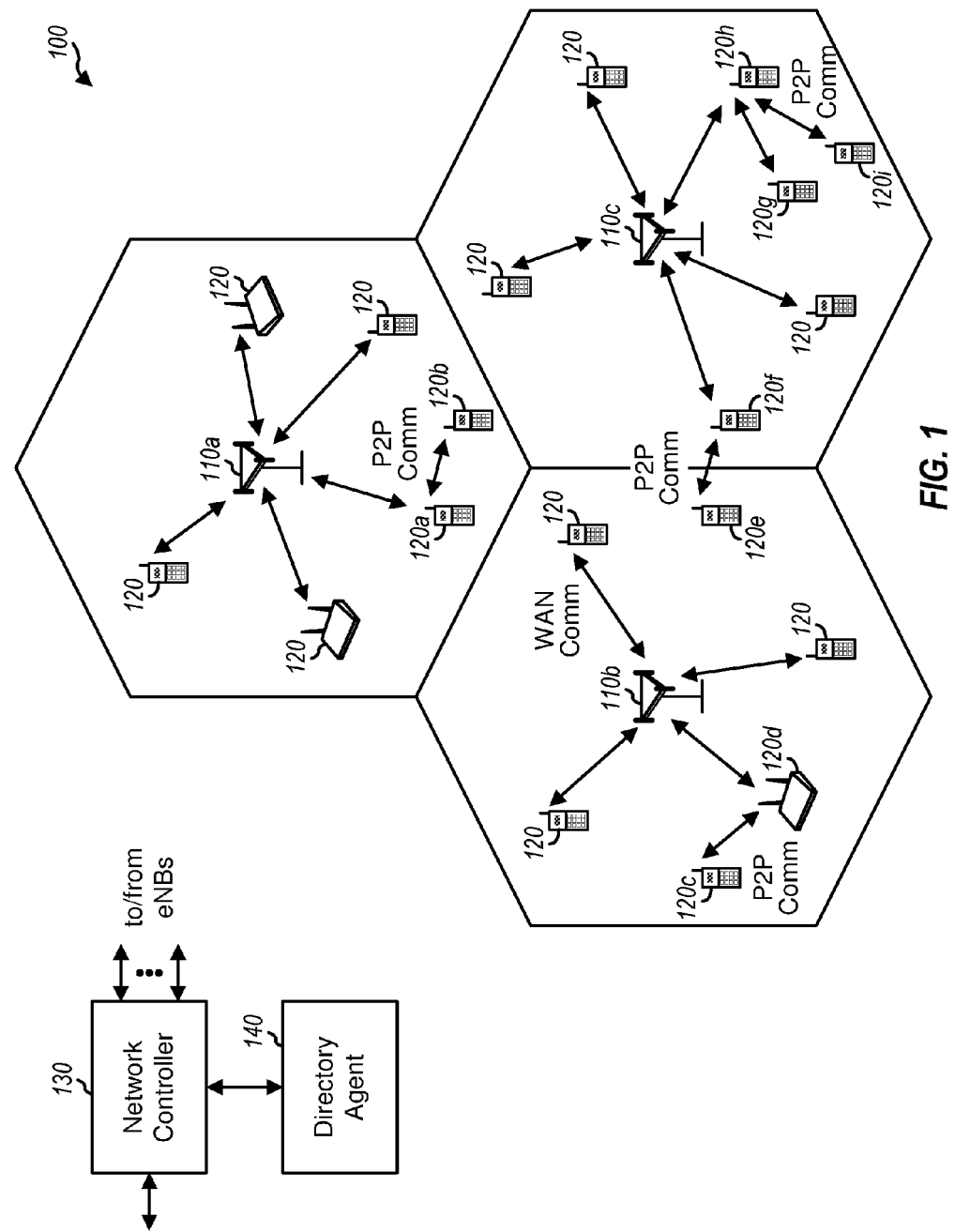
FIG. 1 shows a wireless network.

FIG. 1 shows a wireless network 100, which may be a LTE network or some other wireless network. Wireless network 100 may include a number of evolved Node Bs (eNBs) and other network entities. For simplicity, only three eNBs 110a, 110b and 110c, a network controller 130, and a directory agent 140 are shown in FIG. 1. An eNB may be an entity that communicates with the UEs and may also be referred to as a base station, a Node B, an access point, etc. Each eNB may provide communication coverage for a particular geographic area and may support communication for the UEs located within the coverage area. In 3GPP, the term "cell" can refer to a coverage area of an eNB and/or an eNB subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, wireless network 100 includes macro eNBs 110a, 110b and 110c for macro cells. Wireless network 100 may also include pico eNBs for pico cells and/or home eNBs for femto cells (not shown in FIG. 1).

Network controller 130 may couple to a set of eNBs and may provide coordination and control for these eNBs. Network controller 130 may communicate with the eNBs via a backhaul. The eNBs may also communicate with one another via the backhaul. Directory agent 140 may support peer discovery by UEs, as described below. Directory agent 140 may be a separate network entity (as shown in FIG. 1) or may be part of an eNB or network controller 130.

UEs 120 may be dispersed throughout wireless network 100 and possibly outside the coverage of the wireless network. A UE may be stationary or mobile and may also be referred to as a station, a mobile station, a terminal, an access terminal, a subscriber unit, a device, etc. A UE may be a cellular phone, a personal digital assistant (PDA), a wireless modem, a wireless communication device, a handheld device, a laptop computer, a cordless phone, a wireless local loop (WLL) station, a smartphone, a netbook, a smartbook, a tablet, etc. A UE may be able to communicate with eNBs, relays, other UEs, etc.

In the description herein, WAN communication refers to communication between a UE and an eNB, e.g., for a call with a remote entity such as another UE. A UE interested or engaged in WAN communication may be referred to as a WAN UE. P2P communication refers to direct communication between two or more UEs, without going through an eNB. A UE interested or engaged in P2P communication may be referred to as a P2P UE. A group of two or more UEs engaged in P2P communication may be referred to as a P2P group. In one design, one UE in a P2P group may be designated as a P2P server (or a P2P group owner), and each remaining UE in the P2P group may be designated as a P2P client. The P2P server may perform certain management functions such as exchanging signaling with a wireless network, coordinating data transmission between the P2P server and the P2P client(s), etc.

In the example shown in FIG. 1, UEs 120a and 120b are under the coverage of eNB 110a and are engaged in P2P communication. UEs 120c and 120d are under the coverage of eNB 110b and are engaged in P2P communication. UEs 120e and 120f are under the coverage of different eNBs 110b and 110c and are engaged in P2P communication. UEs 120g, 120h and 120i are under the coverage of the same eNB 110c and are engaged in P2P communication. The other UEs 120 in FIG. 1 are engaged in WAN communication.

P2P communication may offer certain advantages over WAN communication, especially for UEs located close to each other. In particular, efficiency may improve because the pathloss between two UEs may be substantially smaller than the pathloss between either UE to its serving eNB. Furthermore, the two UEs may communicate directly via a single transmission "hop" for P2P communication instead of via two separate transmission hops for WAN communication—one hop for the uplink from one UE to its serving eNB and another hop for the downlink from the same or different eNB to the other UE. P2P communication may thus be used to improve UE capacity and also to improve network capacity by shifting some load over to P2P communication.

One challenge in P2P communication is discovery/detection of peer UEs of interest within a particular range, e.g., within radio frequency (RF) range. In general, peer discovery may be performed based on one or more of the following:

Autonomous peer discovery—a UE performs peer discovery by itself without assistance from a network, and
Network-assisted peer discovery—a UE performs peer discovery with assistance from a network.

For autonomous peer discovery, a UE may occasionally (e.g., periodically or when triggered) transmit a proximity detection signal (PDS) to indicate the presence of the UE. A proximity detection signal may also be referred to as a peer discovery signal, a peer detection signal, etc. A proximity detection signal may comprise a pilot or a reference signal and may carry certain information for a transmitter of the proximity detection signal. Alternatively or additionally, the UE may detect proximity detection signals from other UEs near its proximity Autonomous peer discovery may be relatively simple to implement by UEs. However, autonomous peer discovery may result in (i) severe interference when UEs are dense and close together and (ii) poor battery life when UEs are sparse and far away.

Figure 2:
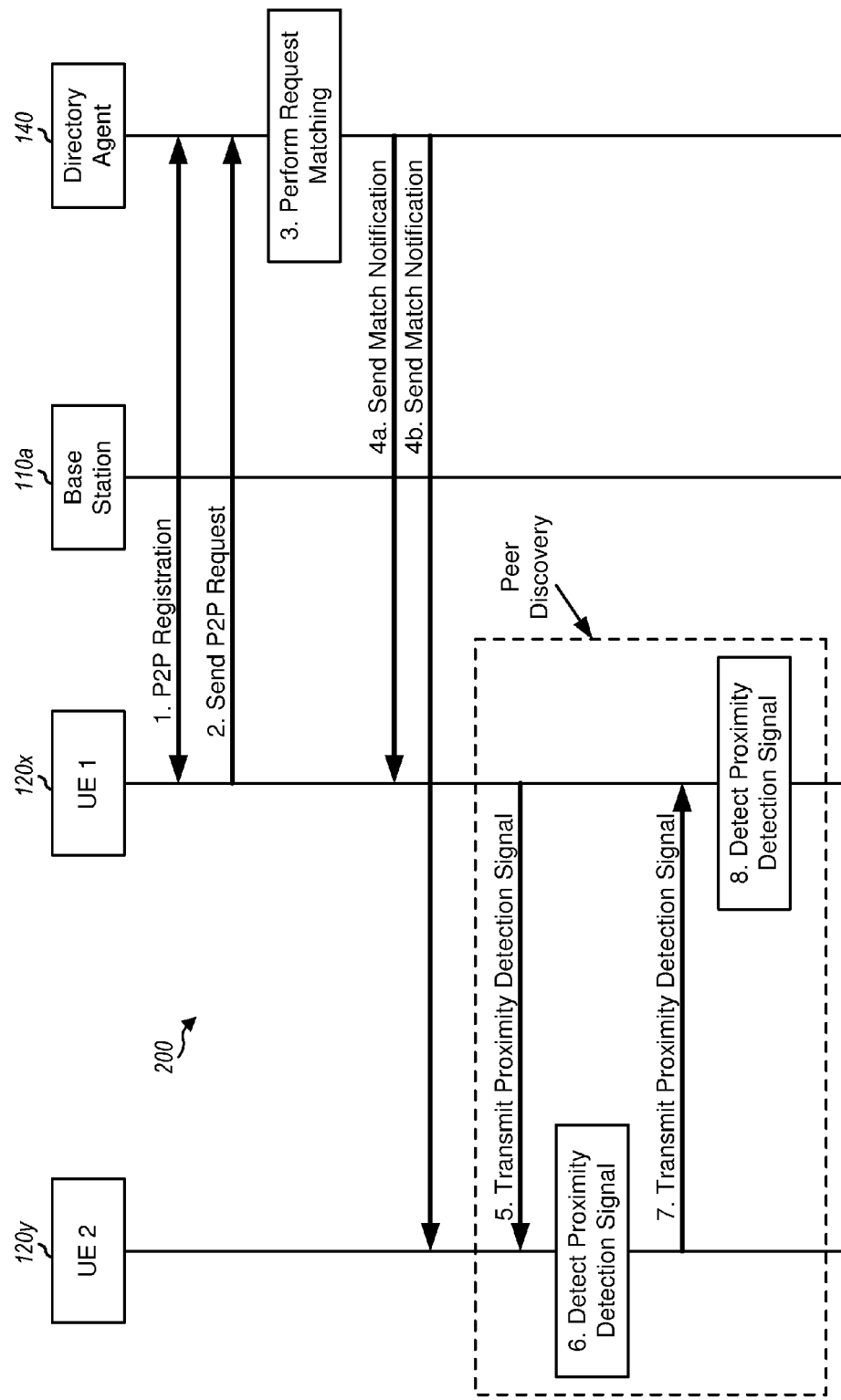
FIG. 2 shows a process for network-assisted peer discovery.

FIG. 2 shows a design of a process 200 for network-assisted peer discovery. A UE 120x may register itself with directory agent 140 upon entering WAN coverage, e.g., upon detecting a macro cell in wireless network 100 (step 1). UE 120x may provide pertinent information to directory agent 140 as part of P2P registration. For example, UE 120x may provide identification information for UE 120x, service information for services requested by UE 120x and/or services provided by UE 120x, location information for UE 120x, etc. UE 120x may perform P2P registration to advertise its services and/or to obtain services. UE 120x may send a P2P request at the time of P2P registration (step 2). The P2P request may indicate services requested by UE 120x and/or services provided by UE 120x. UE 120x may submit a new P2P request or update an existing P2P request at any time after P2P registration. A P2P request may also be implicit and not sent.

Directory agent 140 may perform P2P registration of UEs and may maintain a list of active P2P requests from these UEs. Directory agent 140 may perform request matching, which may include examining the P2P requests from different UEs and identifying UEs with matching P2P requests (step 3). Request matching may be performed based on various criteria such as the services requested or provided by the UEs, the capabilities of the UEs, the locations of the UEs, etc. For example, a match may be declared between UE 120x and UE 120y due to UE 120x providing a service that is requested by UE 120y, or vice versa. A match may also require the two UEs to be within RF proximity of one another, which may be determined based on location information provided by the UEs during P2P registration.

If a match is found for UE 120x, then directory agent 140 may send a notification of the match to UE 120x (step 4a). Directory agent 140 may also notify UE 120y, which may be part of the match for UE 120x (step 4b). The match notifications may inform UEs 120x and 120y to initiate peer discovery, if needed. The match notifications may also convey resources and/or other parameters to use for peer discovery. UEs 120x and 120y may perform peer discovery in response to receiving the match notifications from directory agent 140. For peer discovery, UE 120x may transmit a proximity detection signal to indicate its presence (step 5), and UE 120y may detect the proximity detection signal from UE 120x (step 6). Additionally or alternatively, UE 120y may transmit a proximity detection signal to indicate its presence (step 7), and UE 120x may detect the proximity detection signal from UE 120y (step 8).

FIG. 2 shows a design of network-assisted peer discovery using directory agent 140. Network-assisted peer discovery may also be performed in other manners. Network assistance may also be provided in transmission and reception of proximity detection signals. In one design, for tightly-controlled network-assisted peer discovery, a network (e.g., an eNB or directory agent 140) may determine which P2P UE should transmit and/or which P2P UE should receive proximity detection signals, which resources to use to transmit or receive the proximity detection signals, which signals to use for the proximity detection signals, etc. In one design, for loosely-controlled network-assisted peer discovery, the network may reserve some resources (e.g., time, frequency, code and/or other resources) for proximity detection signals and may inform the P2P UEs (e.g., via broadcast information). A transmitting P2P UE may (e.g., randomly) select some of the reserved resources and may transmit its proximity detection signal based on the selected resources. Receiving P2P UEs may search all reserved resources to detect proximity detection signals from transmitting P2P UEs. Tightly-controlled network-assisted peer discovery may provide better interference management while loosely-controlled network-assisted peer discovery may be less burdensome on the network side and may also have less signaling overhead.

Network assistance may also be provided for communication between P2P UEs after peer discovery. In one design, P2P UEs may measure received signal strength of proximity detection signals from detected P2P UEs and may send pilot measurement reports to the network. The network may select P2P communication or WAN communication for the P2P UEs based on the pilot measurement reports and/or other information. The network may also assign resources for P2P communication between P2P UEs.

Network-assisted peer discovery may result in better control of interference and may also save power at P2P UEs. However, network-assisted peer discovery would not work for the UEs outside the coverage of the network. In one design, network-assisted peer discovery may be used when available (e.g., when in network coverage), and autonomous peer discovery may be used when network-assisted peer discovery is unavailable. Autonomous peer discovery may be used without any network control or coverage.

For both autonomous and network-assisted peer discovery, a UE may transmit a proximity detection signal to indicate its presence and facilitate its discovery by other UEs. It may be desirable to utilize a proximity detection signal having good performance and also simplify processing to transmit and/or receive the proximity detection signal.

In an aspect, a proximity detection signal may be generated based on one or more physical channels or signals used in a wireless network. These physical channels and signals may be designed to have good performance for WAN communication and may thus provide good performance for peer discovery. These physical channels and signals may also be transmitted and/or received by UEs for WAN communication. Hence, the UEs may already be able to transmit and/or receive these physical channels and signals, which may reduce complexity for peer discovery. Various physical channels and signals may be used for the proximity detection signal. Some exemplary physical channels and signals that may be used for peer discovery are described below.

Wireless network 100 may support a set of physical channels and signals for the downlink and another set of physical channels and signals for the uplink. The physical channels and signals for the downlink and uplink may be dependent on the radio technology supported by wireless network 100. Table 1 lists a set of physical channels and signals for the downlink in LTE.

TABLE 1

Physical Channels and Signals for Downlink in LTE

| Physical Channel or Signal | Acronym | Description |
|---|---|---|
| Primary Synchronization Signal | PSS | Signal used by UEs for cell search and acquisition. |
| Secondary Synchronization Signal | SSS | Signal used by UEs for cell search and acquisition. |
| Physical Broadcast Channel | PBCH | Physical channel carrying some system information. |
| Physical Downlink Control Channel | PDCCH | Physical channel carrying control information on downlink. |
| Physical Downlink Shared Channel | PDSCH | Physical channel carrying data for UEs scheduled for data transmission on downlink. |
| Cell-Specific Reference Signal | CRS | Reference signal for a specific cell. |
| Positioning Reference Signal | PRS | Reference signal to support positioning. |

A reference signal is a signal that is known a priori by a transmitter and a receiver and may also be referred to as pilot. Different reference signals may be defined for the downlink and uplink and used for different purposes.

Table 2 lists a set of physical channels and signals for the uplink in LTE.

TABLE 2

Physical Channels and Signals for Uplink in LTE

| Physical Channel or Signal | Acronym | Description |
|---|---|---|
| Physical Random Access Channel | PRACH | Physical channel carrying random access preambles from UEs attempting to access a wireless network. |
| Physical Uplink Control Channel | PUCCH | Physical channel carrying control information on uplink. |
| Physical Uplink Shared Channel | PUSCH | Physical channel carrying only data or both data and control information on uplink. |
| Sounding Reference Signal | SRS | Reference signal used by eNBs for channel quality measurement. |

LTE supports other physical channels and signals for the downlink and uplink, which are not listed in Tables 1 and 2 for simplicity. The physical channels and signals in Tables 1 and 2 are described in 3GPP TS 36.211, entitled "Evolved Universal Terrestrial Radio Access (E-UTRA); Physical Channels and Modulation," which is publicly available.

Figure 3:
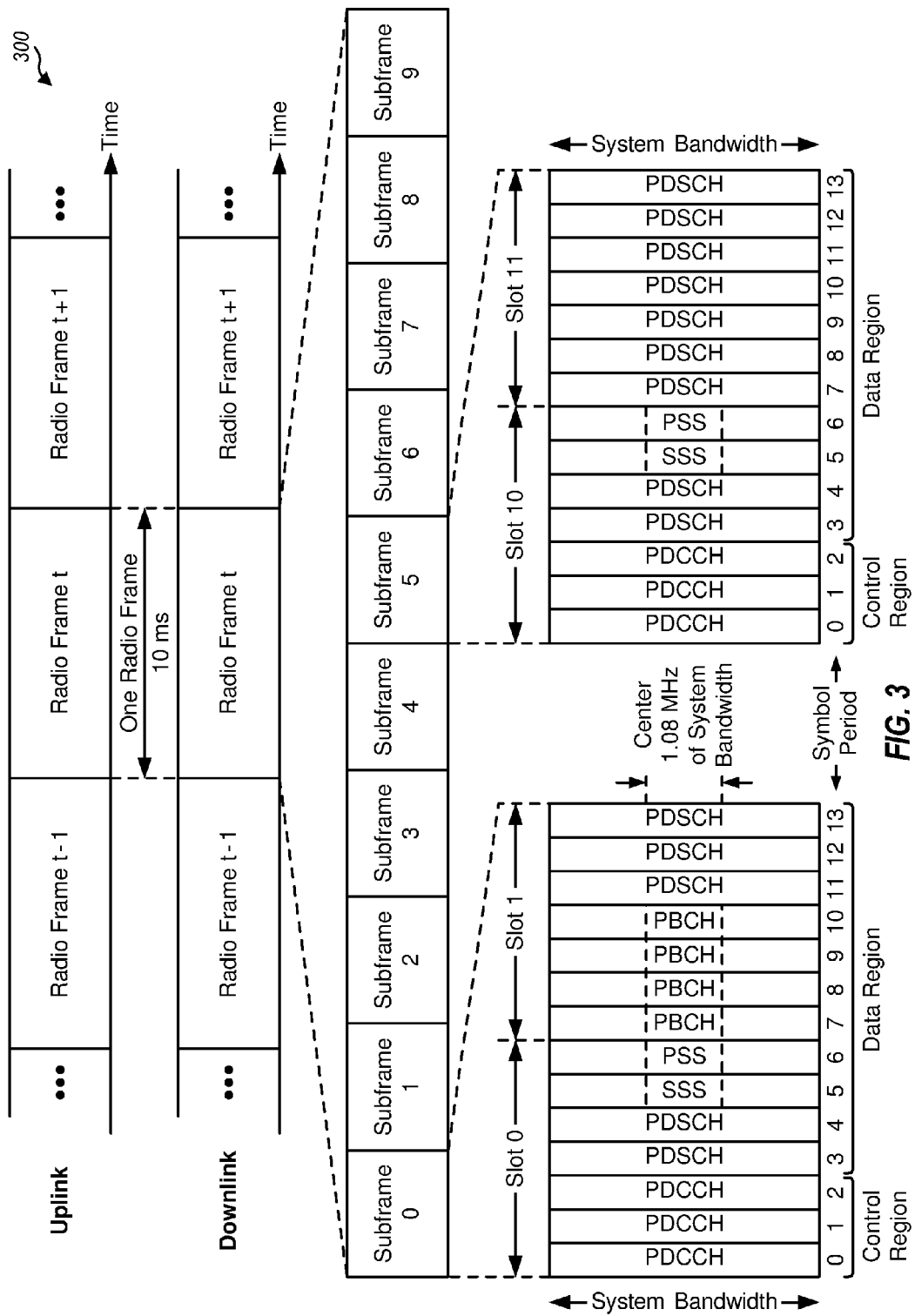
FIG. 3 shows an exemplary frame structure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.25, 2.5, 5, 10 or 20 megahertz (MHz), respectively. The system bandwidth may also be partitioned into subbands. Each subband may cover a range of frequency, e.g., 1.08 MHz.

The available time frequency resources for each of the downlink and uplink may be partitioned into resource blocks. The number of resource blocks available in a slot may be dependent on the system bandwidth and may range from 6 to 110 for system bandwidth of 1.25 MHz to 20 MHz, respectively. Each resource block may cover 12 subcarriers in one slot and may include a number of resource elements. Each resource element may cover one subcarrier in one symbol period and may be used to send one modulation symbol, which may be a real or complex value.

On the downlink, an OFDMA symbol may be transmitted in each symbol period of a subframe. On the uplink, an SC-FDMA symbol may be transmitted in each symbol period of a subframe. An OFDMA symbol may be generated by (i) mapping modulation symbols and/or reference symbols to subcarriers used for transmission and mapping zero symbols with a signal value of zero to the remaining subcarriers, (ii) performing an inverse fast Fourier transform (IFFT) on the mapped symbols to obtain time-domain samples, and (iii) appending a cyclic prefix to obtain an OFDMA symbol. A SC-FDMA symbol may be generated by (i) performing a discrete Fourier transform (DFT) on modulation symbols and/or reference symbols to be transmitted, (ii) mapping the DFT outputs to subcarriers used for transmission and zero symbols to the remaining subcarriers, (iii) performing an IFFT on the mapped symbols to obtain time-domain samples, and (iv) appending a cyclic prefix to obtain a SC-FDMA symbol. A SC-FDMA symbol may be generated with an additional DFT step that is not present in the generation of an OFDMA symbol.

In LTE, an eNB may transmit the PSS and SSS on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix for FDD, as shown in FIG. 3. The PSS and SSS may be used by the UEs for cell search and acquisition. The eNB may transmit the PBCH in symbol periods 0 to 3 in slot 1 of certain radio frames. The PBCH may carry some system information.

A subframe for the downlink may include a control region and a data region, which may be time division multiplexed as shown in FIG. 3. The control region may include the first Q symbol periods of the subframe, where Q may be equal to 1, 2, 3 or 4. Q may change from subframe to subframe and may be conveyed in the first symbol period of the subframe. The control region may carry control information for UEs. The data region may include the remaining 2L−Q symbol periods of the subframe and may carry data and/or other information for UEs.

An eNB may transmit the PDCCH in the control region of a subframe and may transmit the PDSCH in the data region of the subframe. The PDCCH may carry control information such as downlink grants, uplink grants, etc. The PDSCH may carry data for UEs scheduled for data transmission on the downlink. The eNB may also transmit a PRS periodically. The PRS may be measured by UEs for positioning.

In LTE, a UE may transmit the PUCCH, PUSCH, and PRACH on the uplink to an eNB. The PUCCH may carry control information. The PUSCH may carry only data or both data and control information. The PRACH may carry random access preambles sent by the UE to access the wireless network. The UE may also transmit a SRS periodically (when and as configured for the UE). The SRS may be used by the eNB for channel quality measurement.

Figure 4:
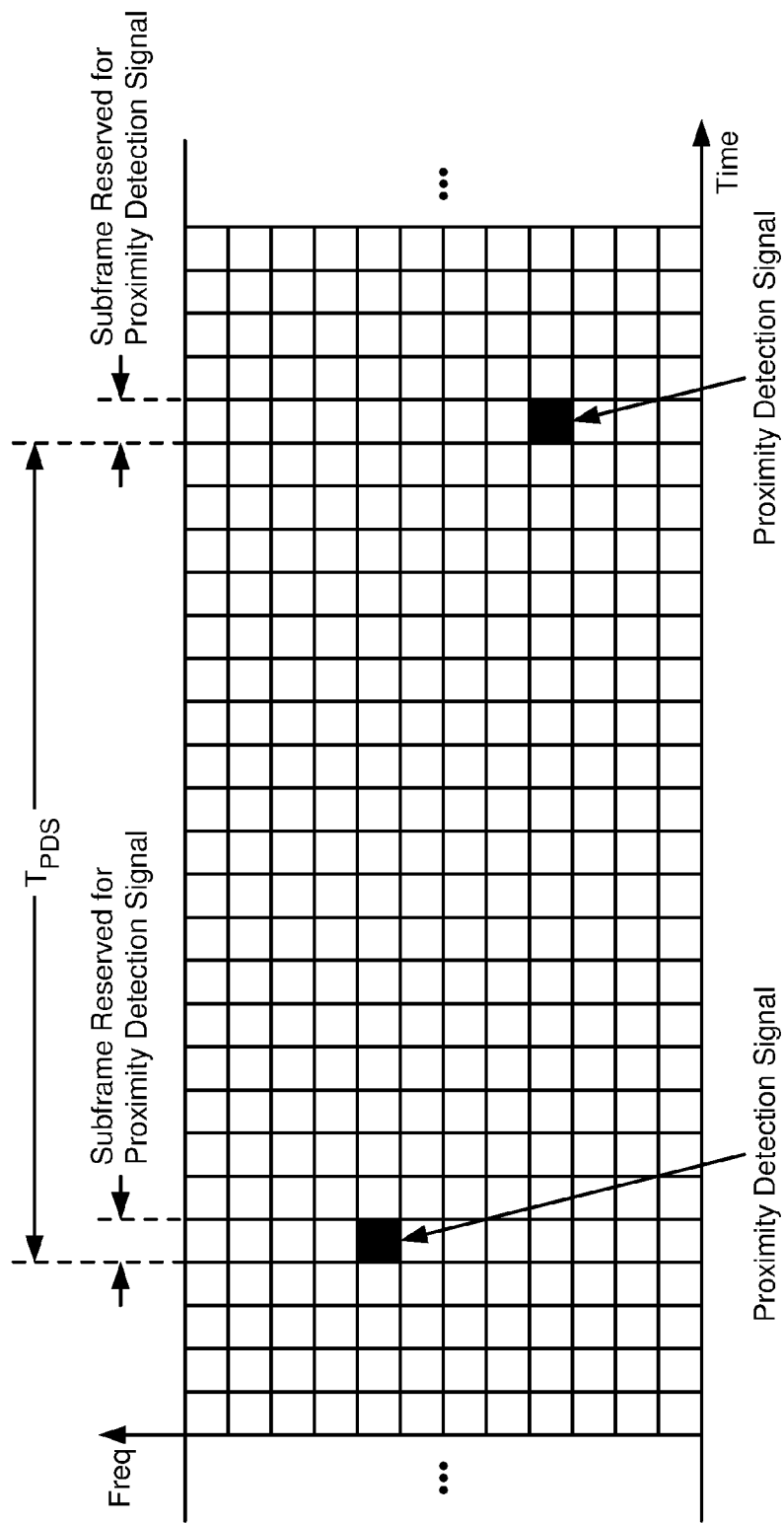
FIG. 4 shows a design of transmitting proximity detection signals.

FIG. 4 shows a design of transmitting proximity detection signals. In this design, some subframes may be reserved for transmission of proximity detection signals by UEs and may be referred to as PDS subframes. The PDS subframes may be spaced apart by $T_{PDS}$ ms, which may be referred to as the PDS periodicity. In general, a proximity detection signal may be transmitted in any portion of a PDS subframe and in any number of symbol periods in the PDS subframe. The time duration in which the proximity detection signal is transmitted may be dependent on how the proximity detection signal is generated, as described below. In one design, a UE may transmit a proximity detection signal in one or more resource blocks in a PDS subframe, as described below.

In general, some resources may be reserved for transmission of proximity detection signals by UEs for peer discovery. The reserved resources may comprise time-frequency resources, which may correspond to all resource blocks in certain subframes, or certain bandwidth in some subframes, or certain symbol periods in some subframes, or time-frequency resources determined in any manner. The reserved resources may also comprise certain sequences, codes, and/or other types of resources.

In one design, the amount of resources reserved for transmission of proximity detection signals may be configurable. For example, 1000, 5000, or 20000 resource blocks may be reserved for transmission of proximity detection signals in light, medium, or high density P2P deployments, respectively. In one design, loading on the reserved resources may be measured by UEs and reported to the network. The loading may be quantified by various metrics, which may be related to statistics of received power (e.g., mean received power, 5 percentile received power, etc.), statistics of the number of peer UEs detected on the reserved resources, etc. Loading information reported by the UEs may be used to change (e.g., increase or decrease) the amount of resources reserved for transmission of proximity detection signals. The network may broadcast information indicative of the reserved resources.

Proximity detection signals may be transmitted on the reserved resources in various manners to mitigate interference between these signals. In one design, a UE may select a reserved resource on which to transmit a proximity detection signal. The reserved resource may be randomly selected by the UE or selected from among reserved resources having low detected signal power. In another design, the UE may transmit the proximity detection signal with a certain probability on a reserved resource selected in a predetermined manner. For example, the UE may transmit its proximity detection signal in each PDS subframe with a probability of $1-P_{blank}$, where $P_{blank}$ is the probability that the UE will not transmit the proximity detection signal.

The use of reserved resources for transmission of proximity detection signals may mitigate interference between P2P signals for P2P communication and WAN signals for WAN communication. The reserved resources may be especially desirable for autonomous peer discovery with uncoordinated transmission of proximity detection signals by P2P UEs. The reserved resources may also allow use of interference cancellation and/or other advanced receiver techniques.

In one design, a proximity detection signal may be generated based on the PUSCH, PUCCH, PDSCH or PDCCH. The proximity detection signal may be transmitted on a minimum resource allocation for the PUSCH, PUCCH, PDSCH, or PDCCH, which may be two resource blocks. The resource blocks used for the proximity detection signal may cover (i) one set of K subcarriers in two slots of one subframe without frequency hopping or (ii) two sets of K subcarriers in two slots with frequency hopping. In one design, K may be equal to 12 for a narrowband proximity detection signal transmitted on one pair of resource blocks covering 180 KHz in one subframe. In another design, K may be a multiple of 12 for a wideband proximity detection signal transmitted on multiple pairs of resource blocks. This design may be used to support a larger payload, which may be required or desirable for some applications with more information to send in the proximity detection signal.

Figure 5:
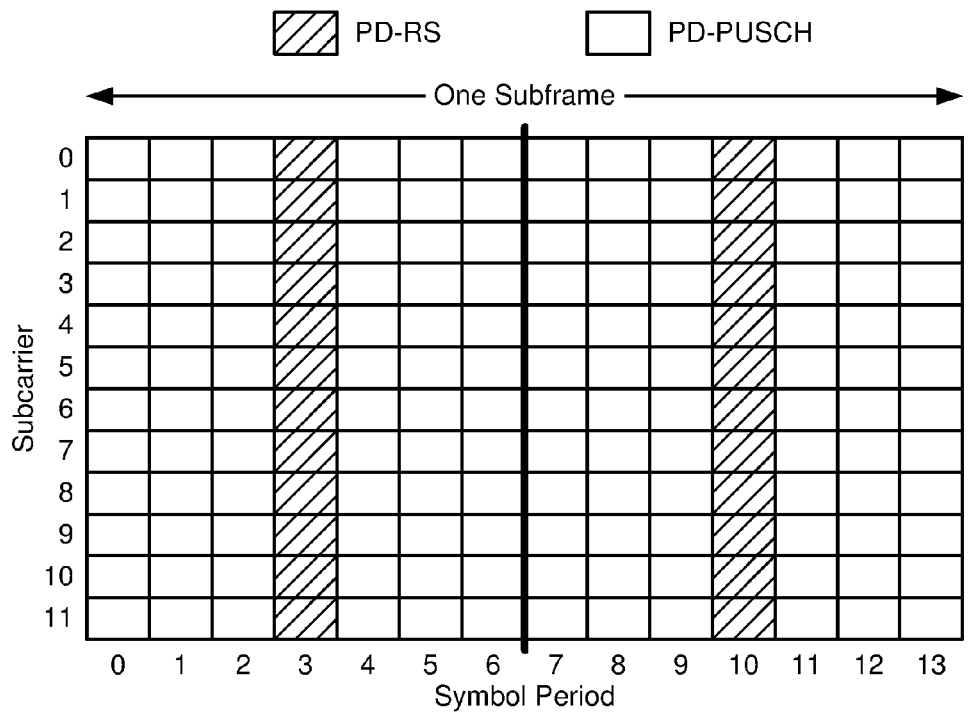
FIG. 5 shows a proximity detection signal generated based on the PUSCH.

FIG. 5 shows a design of a proximity detection signal generated based on the PUSCH. In this design, the peer detection signal may include a proximity detection reference signal (PD-RS) and a data portion, which may be referred to as a proximity detection PUSCH (PD-PUSCH). In one design, the PD-RS may occupy resource elements normally occupied by a demodulation reference signal (DMRS) for the PUSCH, and the PD-PUSCH may occupy the remaining resource elements for the PUSCH. In the design shown in FIG. 5, the PD-RS may occupy the middle symbol period of each slot (or symbol periods 3 and 10 for the normal cyclic prefix), and the PD-PUSCH may occupy the remaining symbol periods in the subframe (or symbol periods 0-2, 4-9, and 11-13). A PD-RS is a reference signal that may be used for coherent detection of the PD-PUSCH. The PD-PUSCH may carry information for the proximity detection signal, e.g., identification information such as a UE identity (ID) of a UE transmitting the proximity detection signal, service information indicative of service(s) requested by the UE and/or service(s) offered by the UE, location information indicative of the location of the UE, and/or other information.

In one design, information to send in the proximity detection signal may be encoded based on one of a number of transport block sizes supported for the PUSCH for one resource block pair. The coded information may be mapped to modulation symbols based on a predetermined modulation scheme (e.g., QPSK or BPSK). The modulation symbols may then be mapped to resource elements for the PD-PUSCH.

In one design, the PD-RS may be generated based on a reference signal (RS) sequence having good cross-correlation properties. A set of RS sequences may be defined based on different cyclic shifts of a base sequence, which may be a Zadoff-Chu sequence, a computer generated sequence, etc. This set of RS sequences may be used for the DMRS for the PUSCH. The RS sequence used for the PD-RS may be selected from the set of RS sequences available for the DMRS. Reference symbols (or pilot symbols) may be generated based on the RS sequence and mapped to resource elements for the PD-RS.

In one design, a SC-FDMA symbol may be generated for each symbol period in which the PUSCH-based proximity detection signal is transmitted. Each SC-FDMA symbol may be generated based on modulation symbols or reference symbols mapped to subcarriers used for the proximity detection signal and zero symbols mapped to the remaining subcarriers. The SC-FDMA symbols for the proximity detection signal may have a single-carrier waveform and a low peak-to-average-power ratio (PAPR), which may be desirable. In one design, the SC-FDMA symbols for the proximity detection signal may be transmitted using a single antenna port, which may simplify operation of a P2P UE.

Figure 6A:
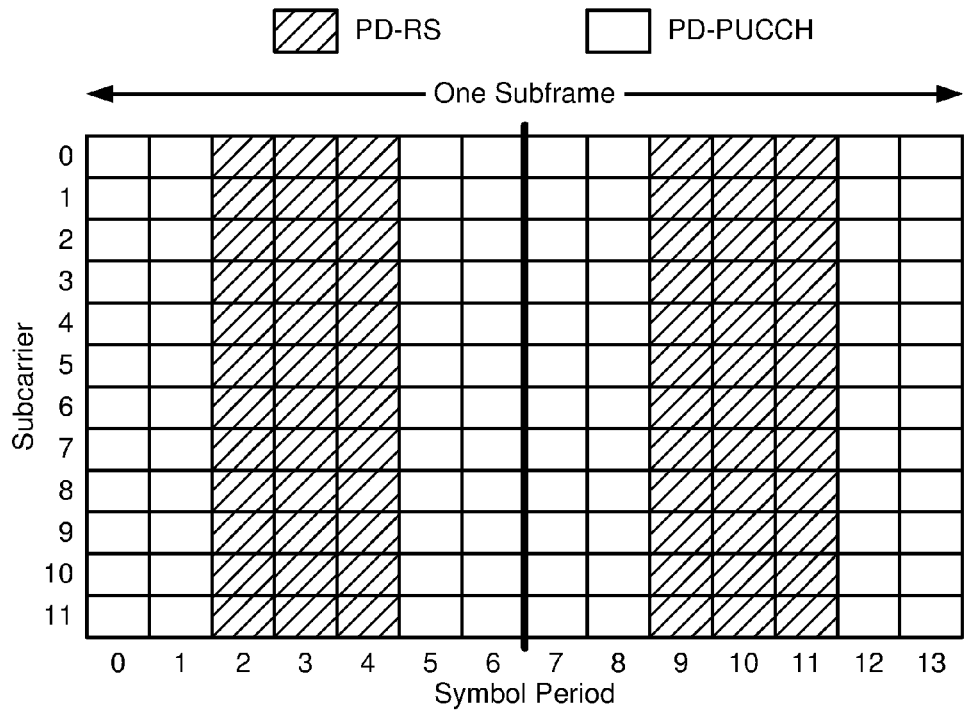
FIGS. 6A and 6B show proximity detection signals generated based on the PUCCH for different formats.

FIG. 6A shows a design of a proximity detection signal generated based on the PUCCH for format 1/1a/1b in LTE. In this design, the peer detection signal may include a PD-RS and a data portion, which may be referred to as a proximity detection PUCCH (PD-PUCCH). The PD-RS may occupy resource elements normally occupied by the DMRS for the PUCCH, and the PD-PUCCH may occupy the remaining resource elements for the PUCCH. For PUCCH format 1/1a/1b, the PD-RS may occupy symbol periods 2-4 in each slot of a subframe, and the PD-PUCCH may occupy the remaining symbol periods in the subframe.

Figure 6B:
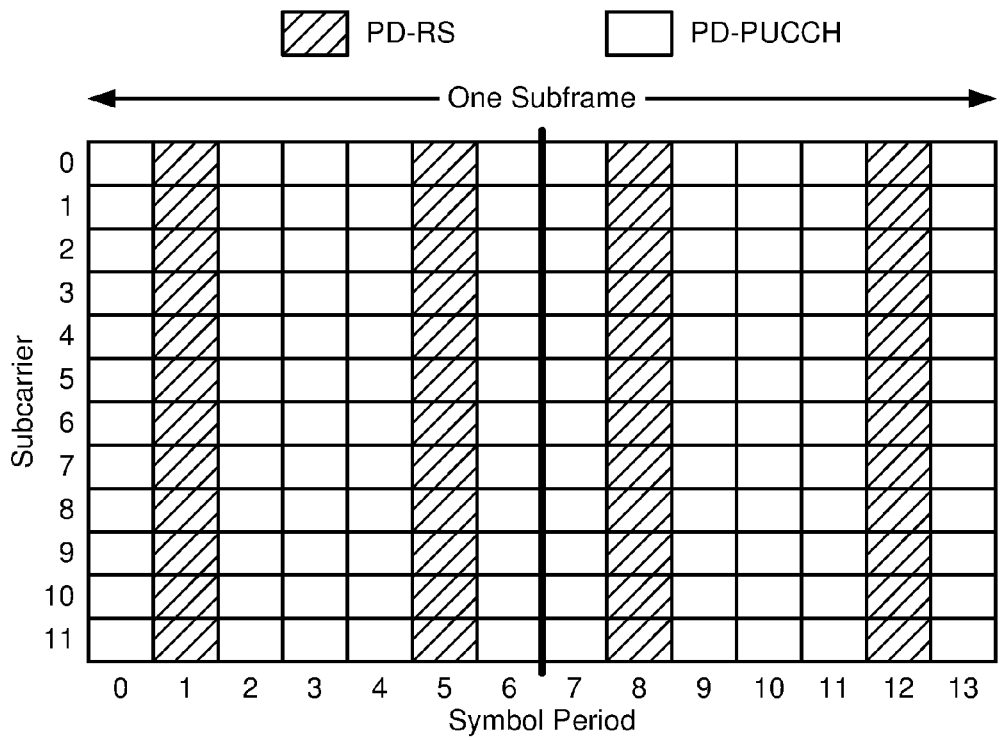

FIG. 6B shows a design of a proximity detection signal generated based on the PUCCH for format 2/2a/2b in LTE. For PUCCH format 2/2a/2b, the PD-RS may occupy symbol periods 1 and 5 in each slot of a subframe, and the PD-PUCCH may occupy the remaining symbol periods in the subframe.

In one design of a proximity detection signal generated based on PUCCH format 1/1a/1b, information to send in the proximity detection signal may be mapped to one modulation symbol, and a RS sequence may be modulated based on the modulation symbol and spread with an orthogonal sequence to obtain multiple modulated RS sequences. In one design of a proximity detection signal generated based on PUCCH format 2/2a/2b, information to send in the proximity detection signal may be mapped to multiple modulation symbols, and a RS sequence may be modulated with each the multiple modulation symbols to obtain one of multiple modulated RS sequences. For all PUCCH formats, each modulated RS sequence may be mapped to K resource elements in one symbol period. The PD-RS may be generated based on the RS sequence. A SC-FDMA symbol may be generated for each symbol period in which the PUCCH-based proximity detection signal is transmitted.

In LTE, an eNB may transmit data (i) in a unicast manner to specific UEs in normal subframes and (ii) in a broadcast manner to all UEs or in a multicast manner to groups of UEs in multicast/broadcast single frequency network (MBSFN) subframes. The PDSCH may have different formats for the normal subframes and MBSFN subframes.

Figure 7A:
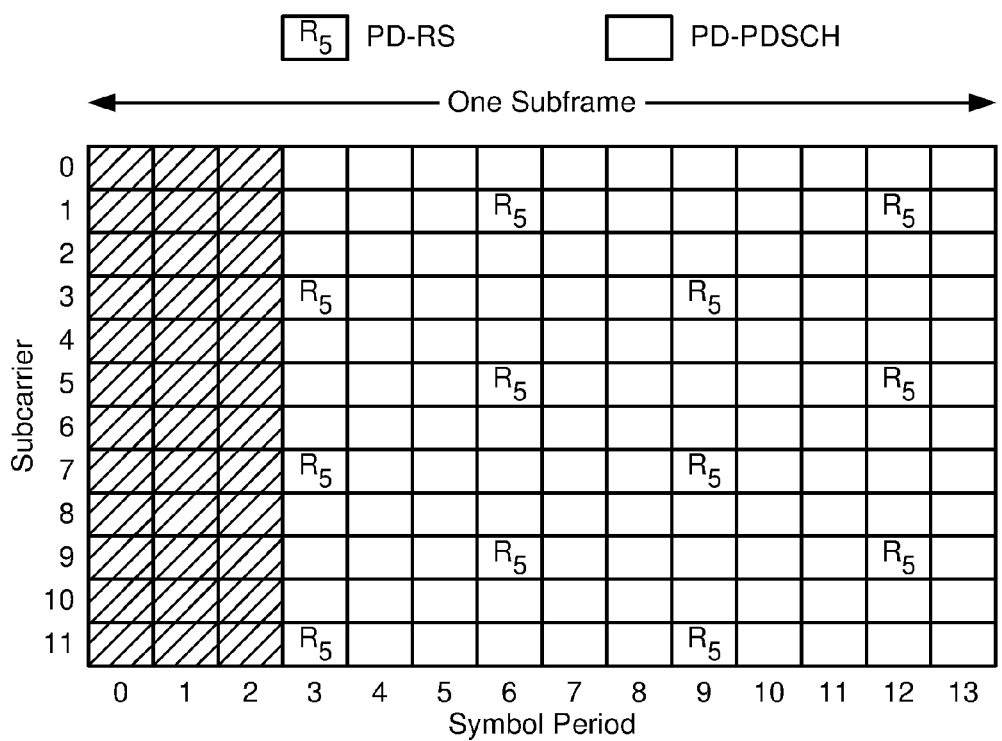
FIGS. 7A and 7B show proximity detection signals generated based on the PDSCH for two subframe types.

FIG. 7A shows a design of a proximity detection signal generated based on the PDSCH in a normal subframe. In this design, the peer detection signal may include a PD-RS and a data portion, which may be referred to as a proximity detection PDSCH (PD-PDSCH). In one design, the PD-RS may occupy resource elements normally occupied by a UE-specific reference signal (UE-RS) for the PDSCH. The PD-RS may occupy a first set of subcarriers in symbol periods 3 and 9 and a second set of subcarriers in symbol periods 6 and 12, with the subcarriers in the second set being staggered with respect to the subcarriers in the first set. FIG. 7A shows a case in which the PD-RS may be transmitted from antenna port 5 on resource elements with label "$R_5$" in FIG. 7A. The PD-RS may also be transmitted from other antenna ports, e.g., from one or more of antenna ports 5 to 14 defined in LTE Release 10. In another design, the PD-RS may occupy resource elements normally occupied by the CRS for the PDSCH. For both designs, the PD-PDSCH may occupy the remaining resource elements for the PDSCH.

In one design, information to send in the proximity detection signal may be encoded and mapped to modulation symbols, e.g., based on a predetermined modulation scheme. The modulation symbols may then be mapped to resource elements for the PD-PDSCH. In one design, the PD-RS may be generated based on a RS sequence in similar manner as for the UE-RS with the following difference. A RS sequence for the UE-RS may be generated based on a pseudo-random number (PN) sequence and a cell ID, which may be within a range of 0 to 503. In one design, a RS sequence for the PD-RS may be generated based on a PN sequence and a UE ID (or a dummy cell ID), which may be within a range of 0 to S, where S may be larger than 511. The RS sequence for the PD-RS may thus be different from the RS sequence for the UE-RS. In one design, a set of RS sequences may be defined for the PD-RS, and one RS sequence in this set may be selected for the PD-RS (e.g., randomly by a UE). Reference symbols may be generated based on the selected RS sequence and mapped to resource elements for the PD-RS.

In one design, an OFDMA symbol may be generated for each symbol period in which the PDSCH-based proximity detection signal is transmitted. Each 01-DMA symbol may be generated based on modulation symbols and/or reference symbols mapped to subcarriers used for the proximity detection signal and zero symbols mapped to the remaining subcarriers. In one design, the OFDMA symbols for the proximity detection signal may be transmitted from one or more antenna ports. The PD-RS may occupy resource elements corresponding to the antenna port(s) from which the proximity detection signal is transmitted.

Figure 7B:
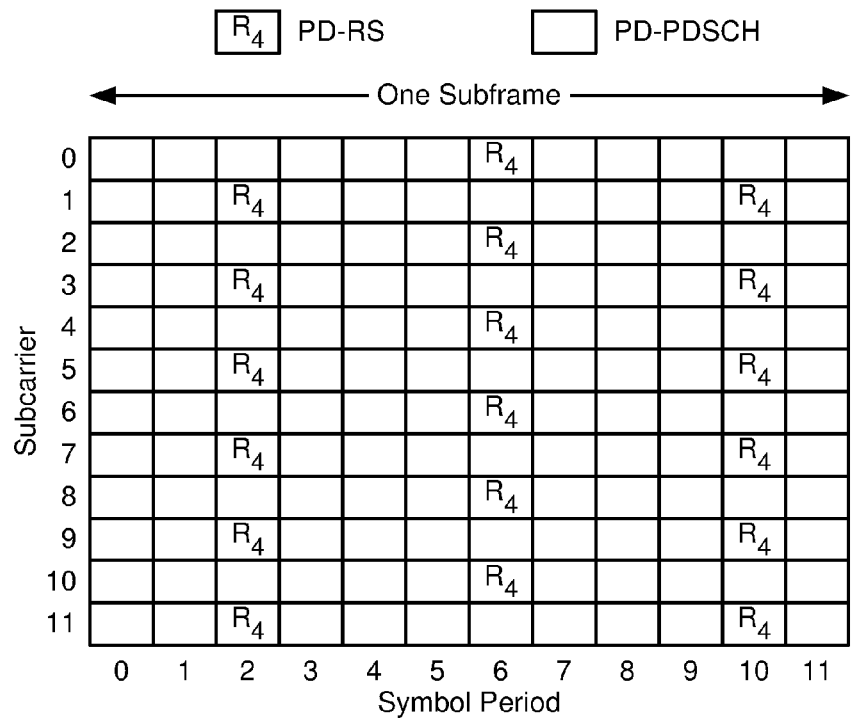

FIG. 7B shows a design of a proximity detection signal generated based on the PDSCH in a MBSFN subframe. In this design, the PD-RS may occupy resource elements normally occupied by a MBSFN reference signal (MBSFN-RS) and may be transmitted from antenna port 4 on resource elements with label "$R_4$" in FIG. 7B. The PD-PDSCH may occupy the remaining resource elements for the PDSCH.

In one design, information to send in the proximity detection signal may be encoded and mapped to modulation symbols, which may then be mapped to resource elements for the PD-PDSCH. In one design, the PD-RS may be generated based on a RS sequence in similar manner as for the MBSFN-RS with the following difference. A RS sequence for the MBSFN-RS may be generated based on a PN sequence and a MBSFN area ID. In one design, a RS sequence for the PD-RS may be generated based on a PN sequence and a UE ID and may have a length of 3K/2 (e.g., a length of 18 for 12 subcarriers). The RS sequence for the PD-RS may be different from the RS sequence for the MBSFN-RS. In one design, a set of RS sequences may be defined for the PD-RS, and one RS sequence in this set may be selected for the PD-RS (e.g., randomly by a UE). Reference symbols may be generated based on the selected RS sequence and mapped to resource elements for the PD-RS.

Figure 8:
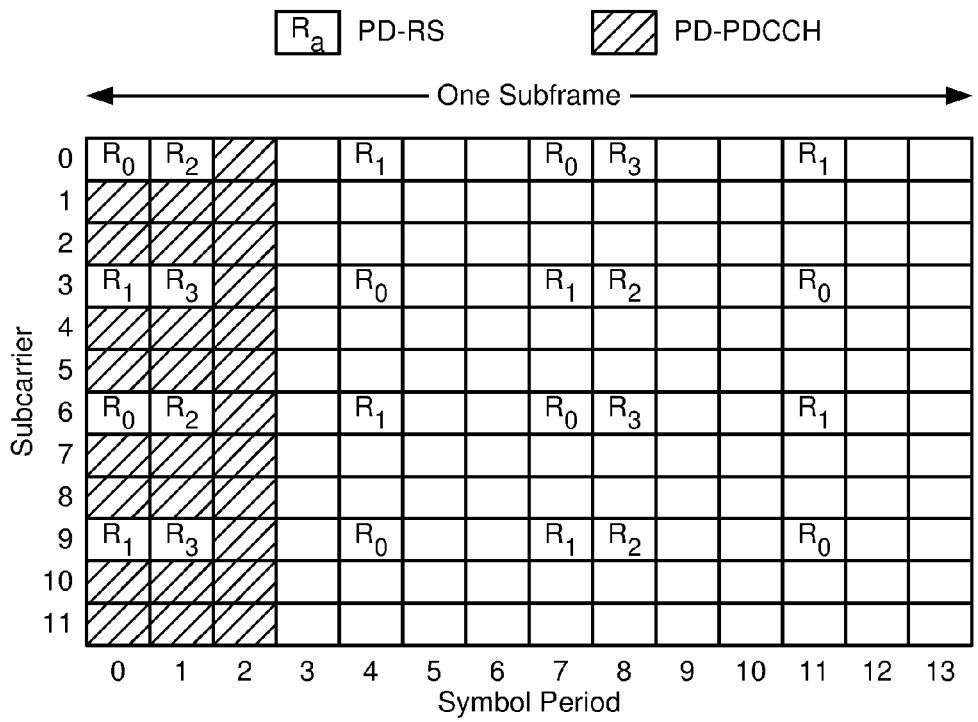
FIG. 8 shows a proximity detection signal generated based on the PDCCH.

FIG. 8 shows a design of a proximity detection signal generated based on the PDCCH in a normal subframe. In this design, the peer detection signal may include a PD-RS and a data portion, which may be referred to as a proximity detection PDCCH (PD-PDCCH). In one design, the PD-RS may occupy resource elements normally occupied by the CRS. The PD-PDCCH may occupy all resource elements not used for the CRS in the control region of a subframe. In one design, the control region may cover a fixed number of symbol periods (e.g., three symbol periods) in a subframe reserved for transmission of proximity detection signals. In one design, information to send in the proximity detection signal may be encoded and mapped to modulation symbols, which may then be mapped to resource elements for the PD-PDCCH.

In one design, a proximity detection signal may be generated based on the PSS and SSS and may be transmitted in a sequence of possibly non-contiguous subframes. The PSS and SSS may be well suited for peer detection and initial synchronization since they are specifically designed for cell search and acquisition in LTE.

The PSS and SSS may be transmitted by eNBs to assist WAN UEs perform cell search and acquisition. A proximity detection signal may be generated by a P2P UE based on the PSS and SSS and transmitted in a manner to avoid confusion with reception of the PSS and SSS from eNBs by WAN UEs. This may be achieved based on one or more of the following:

Transmit a proximity detection signal at a frequency that is not used for the PSS and SSS transmitted by eNBs, e.g., offset from a channel raster,
  Transmit a proximity detection signal on uplink spectrum instead of downlink spectrum in a FDD deployment,
  Transmit the PSS and SSS in a proximity detection signals in symbol locations different from the locations in which the PSS and SSS are transmitted by eNBs,
  Scramble the SSS in a proximity detection signal with a different scrambling sequence than the one used for the SSS transmitted by eNBs, and
  Transmit a cyclic redundancy check (CRC) with a proximity detection signal.

The features listed above are described in further detail below.

P2P UEs may be synchronized to the wireless network, which may be beneficial to allow the P2P UEs to time division multiplex between WAN communication and P2P communication without significant resource wastage. If P2P UEs are synchronized to the wireless network and transmit their proximity detection signals comprising the PSS and SSS in the center 1.08 MHz (i.e., the middle six resource blocks), then WAN UEs may confuse the PSS and SSS from the P2P UEs with the PSS and SSS from eNBs. Confusion between the PSS and SSS from P2P UEs and the PSS and SSS from eNBs may be addressed in various manners.

In one design, a P2P UE may transmit a proximity detection signal comprising the PSS and SSS at a frequency that is not used to transmit the PSS and SSS by any eNB. The wireless network may utilize a channel raster of 100 kHz for all frequency bands, which means that a carrier center frequency (i.e., the center of the system bandwidth) must be an integer multiple of 100 kHz. Frequencies that are spaced apart by the channel raster may be referred to as channel raster frequencies. The carrier center frequency must be one of the channel raster frequencies. In LTE, an eNB may transmit the PSS and SSS on six resource blocks centered at the carrier center frequency. Hence, the center frequency of the PSS and SSS is an integer multiple of 100 kHz. Transmitting the PSS and SSS in the center six resource blocks results in the frequency mapping of the PSS and SSS to be invariant with respect to the system bandwidth, which may range from 6 to 110 resource blocks. This allows WAN UEs to synchronize to the wireless network without the need for a priori knowledge of the system bandwidth.

Figure 9:
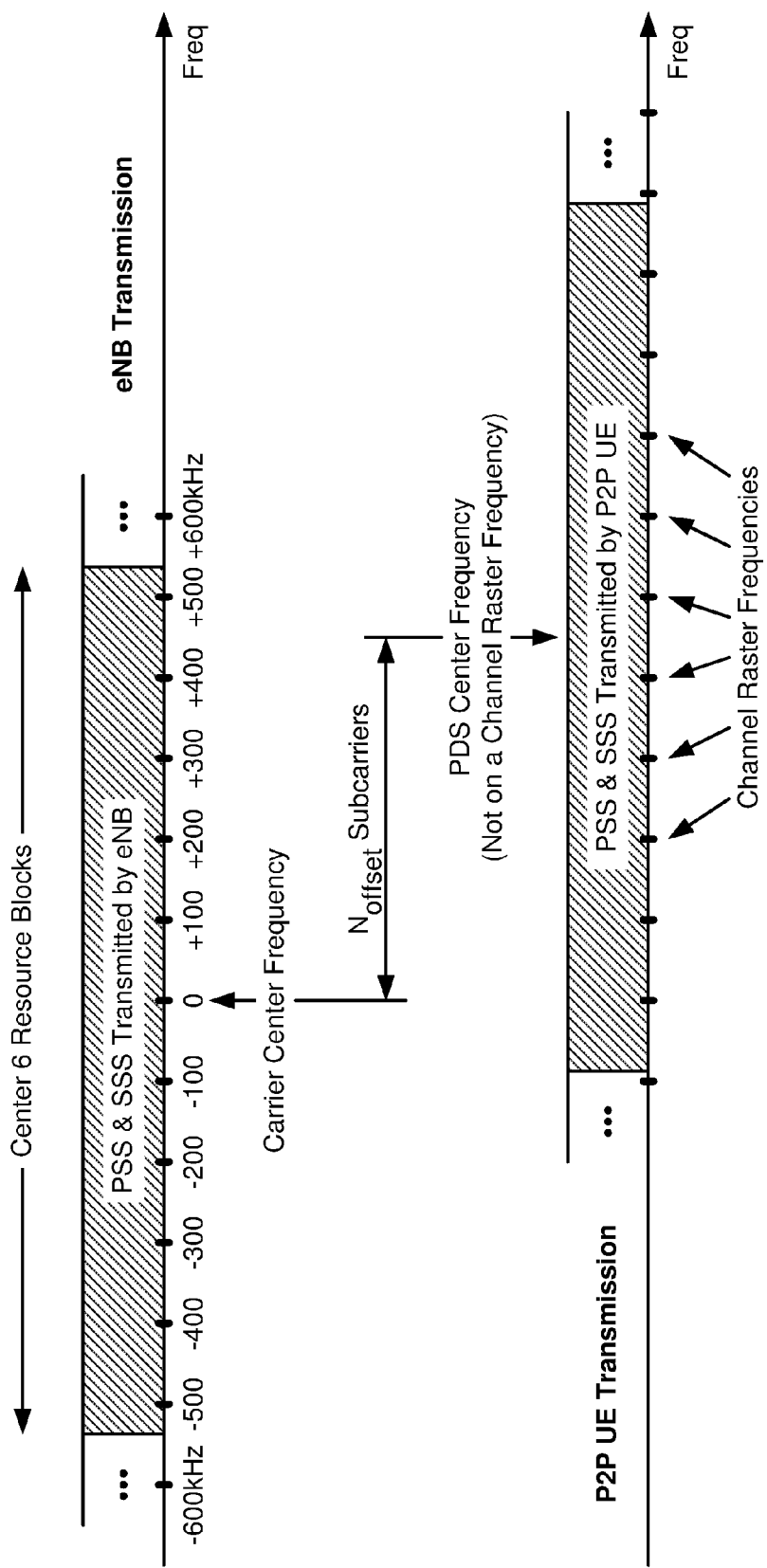
FIG. 9 shows transmission of a proximity detection signal on a non-raster channel frequency.

FIG. 9 shows a design of transmitting a proximity detection signal on a non-raster channel frequency to avoid confusion between the PSS and SSS from P2P UEs and the PSS and SSS from eNBs. A non-raster channel frequency may be any frequency that is not an integer multiple of a channel raster, i.e., not an integer multiple of 100 kHz in LTE. An eNB may transmit its PSS and SSS on the center 72 subcarriers (corresponding to six resource blocks) in the center of the system bandwidth. The PSS and SSS may thus be centered at the carrier center frequency, as shown in FIG. 9. The spacing between subcarriers may be denoted as $\Delta f$ and may be equal to 15 kHz in LTE. In one design, the center frequency of a proximity detection signal (i.e., the PDS center frequency) may be offset from the carrier center frequency by $N_{offset}$ subcarriers, where $N_{offset}$ may be selected such that $N_{offset} * \Delta f$ is not an integer multiple of the channel raster of 100 kHz in LTE. Hence, $N_{offset}$ may be selected such that the PDS center frequency does not correspond to any channel raster frequency. In this design, a P2P UE searching for a proximity detection signal will not detect the PSS and SSS transmitted by eNBs. Similarly, a WAN UE performing cell search on channel raster frequencies will not detect proximity detection signals transmitted by P2P UEs.

In general, $N_{offset}$ may be selected such that the PDS center frequency is not an integer multiple of the channel raster of any radio technology (e.g., LTE, UMTS, etc.) used by the wireless network. This may minimize impact due to the proximity detection signals on cell search for all radio technologies utilized by the wireless network.

In one design, the network may provide a list of center frequencies that can be used as the PDS center frequency and hence should be scanned to detect for proximity detection signals transmitted by P2P UEs. This list may be broadcast in system information or provided to P2P UEs in other manners. In one design, the list of PDS center frequencies to be scanned does not include any channel raster frequency. This design may avoid transmission of the PSS and SSS on a raster channel frequency by P2P UEs and may avoid false alarms by WAN UEs.

Figure 10:
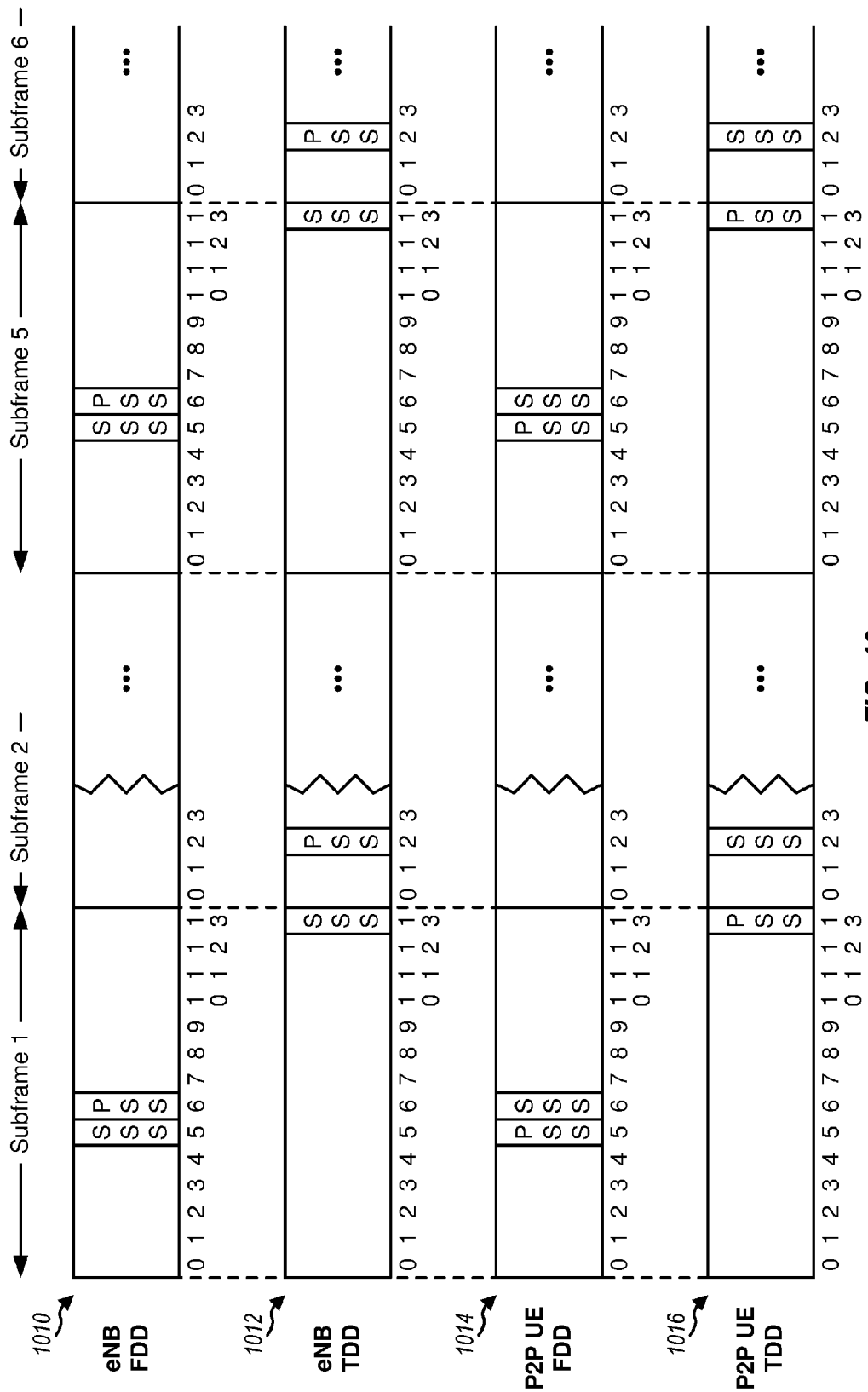
FIG. 10 shows transmission of a proximity detection signal comprising the PSS and SSS.

FIG. 10 shows a design of transmitting the PSS and SSS in a proximity detection signal in different symbol locations to avoid confusion with the PSS and SSS from eNBs. An eNB may transmit the PSS and SSS in symbol periods 6 and 5, respectively, of subframes 0 and 5 in FDD, as shown by a waveform 1010. An eNB may transmit the PSS in symbol period 2 of subframes 1 and 6 and the SSS in symbol period 13 of subframes 0 and 5 in TDD, as shown by a waveform 1012. In one design shown in FIG. 10, the positions of the PSS and SSS in a proximity detection signal may be swapped relative to the positions of the PSS and SSS transmitted by an eNB. In this design, a P2P UE may transmit the PSS and SSS in symbol periods 5 and 6, respectively, in FDD, as shown by a waveform 1014. A P2P UE may transmit the PSS in symbol period 13 of subframes 0 and 5 and the SSS in symbol period 2 of subframes 1 and 6 in TDD, as shown by a waveform 1016.

In another design, the PSS and SSS in a proximity detection signal may be sent at TDD symbol locations in a FDD deployment and at FDD symbol locations in a TDD deployment. Hence, if wireless network 100 utilizes FDD, then an eNB may transmit its PSS and SSS as shown by waveform 1010, and a P2P UE may transmit the PSS and SSS in the proximity detection signal as shown by waveform 1012. Conversely, if wireless network 100 utilizes TDD, then an eNB may transmit its PSS and SSS as shown by waveform 1012, and a P2P UE may transmit the PSS and SSS in the proximity detection signal as shown by waveform 1010.

The designs described above may enable P2P UEs to reuse most of a cell searcher to detect proximity detection signals. For example, a P2P UE may use the cell searcher to detect PSS and SSS from eNBs at symbol locations defined for FDD and detect PSS and SSS from P2P UEs at symbol locations defined for TDD.

In yet another design, the spacing between the PSS and SSS in a proximity detection signal may be different than the spacing between the PSS and SSS transmitted by eNBs. For example, in a FDD deployment, the spacing between the PSS and SSS in a proximity detection signal may be increased to two slots while maintaining the PSS at the same symbol location (i.e., the same slot and radio frame positions) as the PSS transmitted by eNBs. The PSS and SSS in a proximity detection signal may also be sent in other symbol locations different from the symbol locations of the PSS and SSS transmitted by eNBs.

In another design, a proximity detection signal may be transmitted at a non-raster channel frequency and also in different symbol locations to avoid confusion between the PSS and SSS from P2P UEs and the PSS and SSS from eNBs. For example, in a FDD deployment, a P2P UE may transmit the PSS and SSS in its proximity detection signal in symbol locations shown by waveform 1016 in FIG. 10 and at a PDS center frequency that may be offset by 50 kHz from the channel raster.

In one design, the SSS in a proximity detection signal may be scrambled with a different scrambling sequence than the one used for the SSS transmitted by an eNB. A symbol sequence for the SSS may be generated as follows:

$$d(2n) = \begin{cases} s_0^{(m_0)}(n) \cdot c_0(n) & \text{in subframe 0} \\ s_1^{(m_1)}(n) \cdot c_0(n) & \text{in subframe 5} \end{cases} \quad \text{Eq (1)}$$

$$d(2n+1) = \begin{cases} s_1^{(m_1)}(n) \cdot c_1(n) \cdot z_1^{(m_0)}(n) & \text{in subframe 0} \\ s_0^{(m_0)}(n) \cdot c_1(n) \cdot z_1^{(m_1)}(n) & \text{in subframe 5} \end{cases} \quad \text{Eq (2)}$$

where
d(2n) denotes even-numbered symbols in the sequence,
d(2n+1) denotes odd-numbered symbols in the sequence,
$s_0^{(m_0)}(n)$ and $s_1^{(m_1)}(n)$ denote two cyclic shifts of an m-sequence,
$c_0(n)$ and $c_1(n)$ denote two scrambling sequences,
$z_1^{(m_0)}(n)$ and $z_1^{(m_1)}(n)$ denote two additional scrambling sequences.

As shown in equations (1) and (2), the SSS may be generated by interleaving, in the frequency domain, two BPSK modulated secondary synchronization sequences d(2n) and d(2n+1) of length 31. Sequence d(2n) is also referred to as SSC1, and sequence d(2n+1) is also referred to as SSC2. In each SSS transmission, SSC1 and SSC2 are scrambled by different scrambling sequences $c_0(n)$ and $c_1(n)$, respectively, which are dependent on the PSS. SSC2 is further scrambled by a sequence $z_1^{(m_0)}(n)$ or $z_1^{(m_1)}(n)$ that depends on SSC1. In one design, to further distinguish the SSS in a proximity detection signal from the SSS transmitted by eNBs, different scrambling sequences may be used for SSC2 by P2P UEs and eNBs and/or different scrambling sequences may be used for SSC1 by P2P UEs and eNBs.

An eNB may generate the PSS and SSS based on various sequences, which may be determined based on a physical cell ID (PCI) of a cell. The PCI may thus be conveyed in the PSS and SSS transmitted by the eNB. The eNB may also generate the CRS based on a PN sequence, which may be initialized based on the PCI. The eNB may transmit the CRS on resource elements determined based on the PCI in each normal subframe.

In one design, a P2P UE may transmit a CRS along with the PSS and SSS in a proximity detection signal. The CRS may be used as a virtual CRC check for the proximity detection signal. In particular, a receiving P2P UE may detect the proximity detection signal, extract an ID sent in the PSS and SSS, and verify this ID based on the CRS for a virtual CRC check. The virtual CRC check may be beneficial to reduce false alarms and may be especially desirable in a P2P environment since the number of PDS transmissions may be quite large. The CRS may also be used by the receiving P2P UE for automatic gain control (AGC) to adjust it receiver gain to the proper level. If the CRS is not transmitted, then the receiving P2P UE may perform AGC based on the first transmission of a proximity detection signal and may perform detection based on one or more subsequent transmissions of the proximity detection signal, which may delay peer detection.

In another design, a proximity detection signal may include an explicit CRC instead of (or in addition to) the CRS. In one design, CRC bits may be sent on resource elements normally used to transmit the CRS. The CRC bits may also be transmitted at the same power level as (or at a fixed power offset from) the PSS and SSS and may be used for AGC setting by receiving P2P UEs.

Information to send in a proximity detection signal may be conveyed via the PSS and SSS included in the proximity detection signal. For example, the PSS and SSS may be generated by an eNB based on a cell ID having a value within a range of 0 to 503, as described in LTE Release 8. It may be desirable to send more information than the amount that can be sent on the PSS and SSS by the eNB. In one design, a proximity detection signal may include the PSS and SSS as well as the PBCH. In this design, the extra information that cannot be sent in the PSS and SSS may be sent instead on the PBCH. In one design, a set of IDs (e.g., IDs of 0 to 503) may be supported with the PSS and SSS, and all or a subset of these IDs may be associated with additional information sent on the PBCH. The IDs associated with PBCH transmission as a part of a proximity detection signal may be either statically assigned or dynamically indicated by the network, e.g., broadcast in system information or sent via upper layer signaling.

In general, the PSS and SSS may be used for proximity detection signals with both autonomous and network-assisted peer discovery. It may be desirable to use the PSS and SSS for proximity detection signals in autonomous peer discovery. The P2P UEs may not be within network coverage when performing autonomous peer discovery and may need to acquire timing and system information from peer UEs. The use of the PSS and SSS for proximity detection signals may allow the P2P UEs to reuse existing initial cell search procedure for discovery of peer UEs.

Proximity detection signals generated based on the PSS and SSS may have certain advantages. First, timing and frequency offsets between different P2P UEs may be easily tracked based on the proximity detection signals. Second, the proximity detection signals may work well in both tightly-controlled and loosely-controlled network-assisted peer discovery. Third, the proximity detection signals may be detectable at very low signal-to-noise ratio (SINR), especially if interference cancellation is used. For example, if proximity detection signals from two UEs collide on a certain resource, then the stronger proximity detection signal may be detected and decoded first, then the interference due to the stronger proximity detection signal may be estimated and canceled, and the weaker proximity detection signal may then be detected and decoded.

In one design, a proximity detection signal may be generated based on a positioning reference signal (PRS) normally transmitted on the downlink by an eNB. The PRS for the proximity detection signal may be transmitted on a configurable bandwidth, which may be referred to as a PRS bandwidth. The PRS bandwidth may be selected based on a tradeoff between detection performance and overhead.

Figure 11:
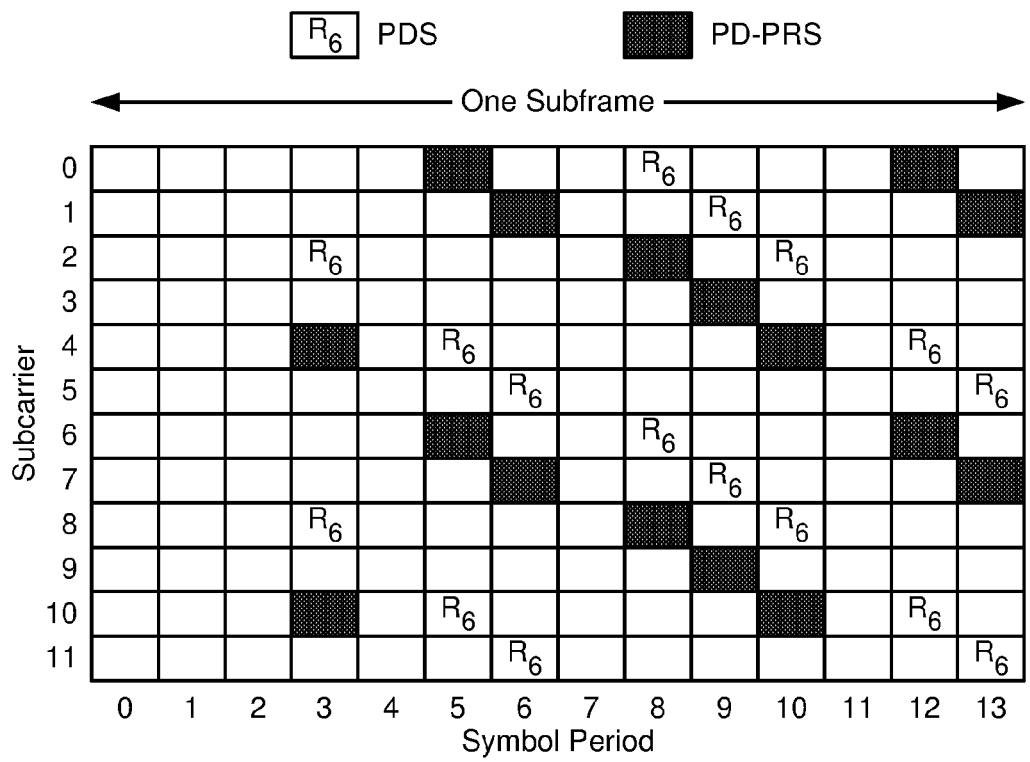
FIGS. 11, 12 and 13 show proximity detection signals generated based on a positioning reference signal (PRS), a sounding reference signal (SRS), and a Physical Random Access Channel (PRACH), respectively.

FIG. 11 shows a design of a proximity detection signal generated based on the PRS. In this design, the peer detection signal may occupy resource elements normally occupied by the PRS transmitted by an eNB (e.g., darkened resource elements that are offset by two subcarriers from resource elements with label "$R_6$" in FIG. 11). The proximity detection signal may be transmitted from antenna port 6 or some other antenna port. As shown in FIG. 11, the proximity detection signal may be transmitted in symbol periods 3, 5, 6, 8, 9, 10, 12 and 13 of a subframe. The proximity detection signal may also be transmitted on subcarriers that are spaced apart by six subcarriers in each symbol period in which the proximity detection signal is transmitted. The proximity detection signal may be transmitted on resource elements that are staggered across time and frequency to facilitate timing and frequency tracking. Up to six UEs may be multiplexed on the same PRS bandwidth and may transmit their proximity detection signals on different subcarriers.

In one design, some bandwidth may be reserved for transmission of proximity detection signals based on the PRS. The reserved bandwidth may be cleared of transmissions from eNBs and WAN UEs in order to avoid interference to proximity detection signals from P2P UEs.

In one design, a proximity detection signal may be generated based on a SRS normally transmitted on the uplink by a WAN UE. The SRS for the proximity detection signal may be transmitted in one symbol period on a configurable bandwidth, which may be referred to as a SRS bandwidth. For example, the SRS bandwidth for a SRS transmission may range from 48 to 576 subcarriers for 10 MHz system bandwidth. A SRS transmission may also be sent on fewer subcarriers (e.g., 12 subcarriers) or more subcarriers.

Figure 12:
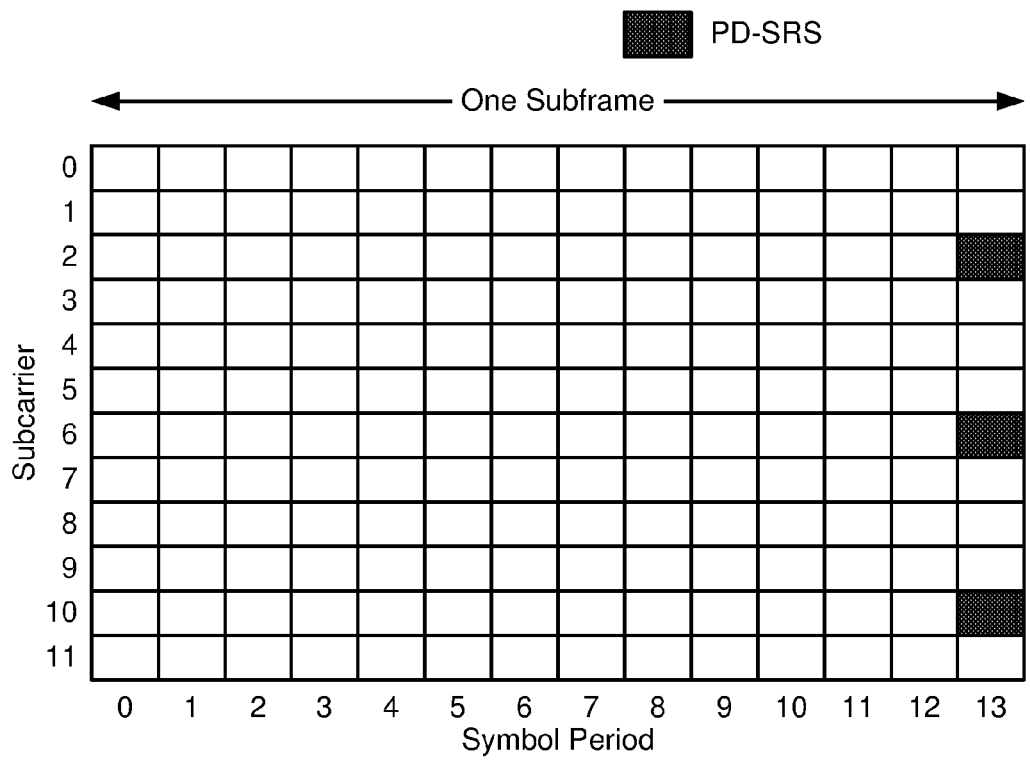

FIG. 12 shows a design of a proximity detection signal generated based on the SRS. In this design, the peer detection signal may occupy resource elements normally occupied by the SRS transmitted by a WAN UE (e.g., darkened resource elements in FIG. 12). As shown in FIG. 12, the proximity detection signal may be transmitted in the last symbol period of a subframe and on subcarriers that are spaced apart by S subcarriers, where S may be 8 or smaller. Up to S different P2P UEs may be multiplexed in the same symbol period and may transmit their proximity detection signals on different subcarriers. Different sets of P2P UEs may transmit their proximity detection signals in different symbol periods of a subframe. In one design, some resources may be allocated for transmission of SRS by UEs, and some of these SRS resources may be reserved for transmission of proximity detection signals by P2P UEs.

Proximity detection signals generated based on the SRS may have certain advantages. First, since each such proximity detection signal may be transmitted in one symbol period, proximity detection signals transmitted by P2P UEs with large timing offsets (e.g., of more than one symbol period) may not interfere one other. Second, the proximity detection signals may be used to track timing offsets where P2P UEs have different propagation delay. Third, the SRS may have some processing gain in the frequency domain and may be able to tolerate interference to a certain extent. Fourth, the SRS may be used for interference management between P2P UEs and WAN UEs.

In one design, a proximity detection signal may be generated based on a PRACH normally transmitted on the uplink by a WAN UE. The PRACH for the proximity detection signal may be transmitted in one subframe on a predetermined bandwidth of six resource blocks, which may be referred to as a PRACH bandwidth.

Figure 13:
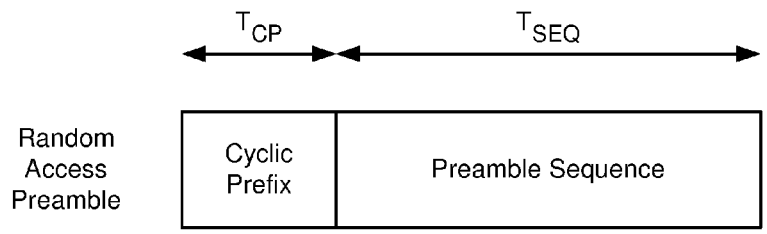

FIG. 13 shows a design of a proximity detection signal generated based on the PRACH. In this design, the peer detection signal may comprise a cyclic prefix of $T_{CP}$ samples followed a preamble sequence of $T_{SEQ}$ samples. $T_{CP}$ and $T_{SEQ}$ may have different values for different preamble formats applicable for the PRACH. For the PRACH, a set of 64 preamble sequences may be available for use for random access to the wireless network. A WAN UE may select one preamble sequence from the set and may transmit the selected preamble sequence on the PRACH. In one design, the same set of 64 preamble sequences may be used for the proximity detection signals. A P2P UE may select one preamble sequence from the set and may transmit the selected preamble sequence as its proximity detection signal. In another design, a set of preamble sequences may be defined for proximity detection signals and may be different from (and have low correlation with) the set of preamble sequences used for the PRACH. For both designs, the number of P2P UEs that can be multiplexed on the same PRACH bandwidth may be determined by the number of preamble sequences (e.g., 64) in the set of preamble sequences available for proximity detection signals.

Interference between the PRACH transmitted by WAN UEs and proximity detection signals transmitted by P2P UEs may be mitigated in various manners. In one design, the same PRACH bandwidth may be used by both the WAN UEs and P2P UEs, but different subframes may be allocated to the WAN UEs for transmission of the PRACH and to the P2P UEs for transmission of the proximity detection signals. In another design, different PRACH bandwidths may be used for the PRACH transmitted by WAN UEs and proximity detection signals transmitted by P2P UEs. In yet another design, different sets of preamble sequences may be used by the WAN UEs and P2P UEs.

Proximity detection signals generated based on the PRACH may have certain advantages. First, the proximity detection signals may have high processing gain, may be robust against timing and frequency offsets and interference from other UEs, and may provide good detection performance even at a low SINR. Second, a PRACH transmitter and a PRACH receiver normally used for WAN communication may also be used for transmission and detection of proximity detection signals generated based on the PRACH with minor changes.

In one design, inter-cell coordination may be performed, and neighboring cells may be allocated different resources for transmission of proximity detection signals by P2P UEs located near cell boundary in order to mitigate/avoid interference between these P2P UEs. In one design, the different resources may be obtained with time division multiplexing (TDM), and P2P UEs in different cells may transmit their proximity detection signals in different time periods (e.g., different subframes). In another design, the different resources may be obtained with frequency division multiplexing (FDM), and P2P UEs in different cells may transmit their proximity detection signals on different bandwidths. In yet another design, the different resources may correspond to different sets of resource elements (or resource blocks), which may be offset from one another by one or more subcarriers. P2P UEs in different cells may then transmit their proximity detection signals on different resource elements (or resource blocks). In yet another design, interference mitigation may be achieved by having P2P UEs generate their proximity detection signals with different RS sequences, which may correspond to different cyclic shifts of a base sequence.

In general, any of the designs described above may be used for autonomous peer discovery and network-assisted peer discovery. The use of physical channels and signals in a wireless network for proximity detection signals may provide good performance while reducing complexity at P2P UEs to support peer discovery. Proximity detection signals may be transmitted by P2P servers and/or P2P clients and also on downlink spectrum and/or uplink spectrum.

P2P UEs may transmit their proximity detection signals at the same transmit power level (which may simplify estimation of pathloss) or at different transmit power levels. P2P UEs may be able to transmit proximity detection signals generated based on uplink signals and channels at a higher transmit power level than proximity detection signals generated based on downlink signals and channels due to a single-carrier waveform for the uplink channels and signals. For example, a P2P UE may be able to transmit a proximity detection signal generated based on the PDSCH at X dBm and to transmit a proximity detection signal generated based on the PUSCH at X+2 dBm. Transmitting at a higher power level may enable detection of the proximity detection signal over longer distances.

In general, any information may be sent in a proximity detection signal. In one design, a set of resources available for proximity detection signals may be mapped to a set of temporary short IDs. The available resources may correspond to different RS sequences for the PRS-based, PUCCH-based, and SRS-based designs. The available resources may correspond to different PSS and SSS sequences for the PSS/SSS-based design. The available resources may correspond to the payload in the data portion for the PUSCH-based, PUCCH-based, PDSCH-based, and PDCCH-based designs. In one design, the set of temporary short IDs may be mapped to a set of global IDs.

A short ID may correspond to a bit string that may be used to identify a transmitting UE of a proximity detection signal. A short ID may not be sufficient to uniquely identify the transmitting UE. Hence, a receiving UE may use other means (e.g., assistance from an eNB or a directory agent) to uniquely identify the transmitting UE from the detected short ID. Short IDs may be used because some signals cannot carry a large payload (e.g., the PSS/SSS may carry a 9-bit payload). The receiving UE may report a PSS/SSS sequence detected by the UE to an eNB, e.g., along with the time and frequency location where the PSS/SSS was detected. The eNB (or the directory agent) may use this information from the receiving UE to deduce a global ID of the transmitting UE.

In another design, a set of available resources may be mapped directly to a set of global IDs. The mapping of available resources to temporary short IDs, the mapping of temporary short IDs to global IDs, and/or the mapping of available resources to global IDs may be performed by the network (e.g., an eNB) and signaled to UEs.

Figures 14, 15:
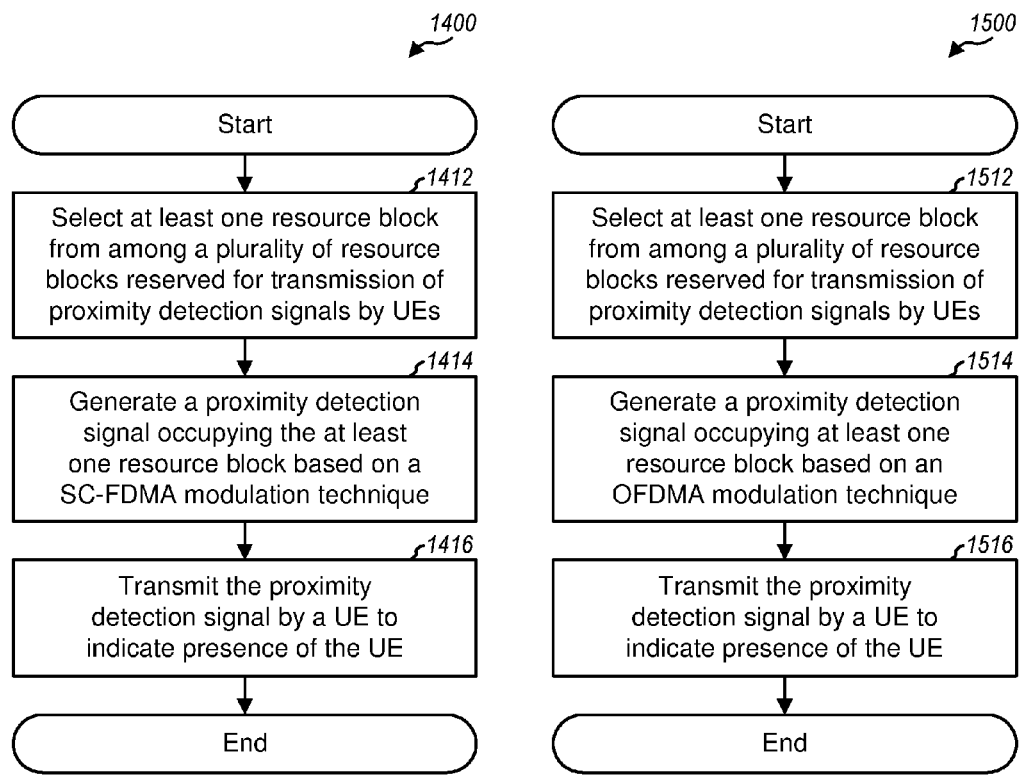
FIGS. 14 and 15 show two processes for performing peer discovery based on different physical channels.

FIG. 14 shows a design of a process 1400 for performing peer discovery based on a physical channel in a wireless network. Process 1400 may be performed by a UE (as described below) or by some other entity. The UE may select at least one resource block from among a plurality of resource blocks reserved for transmission of proximity detection signals by UEs (block 1412). Each resource block may cover a set of subcarriers in a plurality of symbol periods. The UE may generate a proximity detection signal occupying the at least one resource block based on a SC-FDMA modulation technique (block 1414). The UE may transmit the proximity detection signal to indicate its presence and to enable other UEs to detect the UE (block 1416).

In one design of block 1414, the UE may generate a reference signal for at least one symbol period in each of the at least one resource block. In one design, the UE may generate the reference signal based on one of a set of reference signal sequences reserved for proximity detection signals. The UE may generate a data signal for at least one remaining symbol period in each resource block.

In one design, the UE may encode data to be sent in the proximity detection signal based on a coding scheme, map the encoded data to modulation symbols based on a modulation scheme, and generate at least one SC-FDMA symbol for the at least one remaining symbol period based on the modulation symbols. The UE may select a modulation and coding scheme in a set of modulation and coding schemes supported for data transmission and may determine the coding scheme and the modulation scheme based on the selected modulation and coding scheme. The UE may generate the proximity detection signal for transmission on the PUSCH or PUCCH. The UE may generate the at least one SC-FDMA symbol based on the modulation symbols in different manners for the PUSCH and PUCCH, as described above.

FIG. 15 shows a design of a process 1500 for performing peer discovery based on a physical channel in a wireless network. Process 1500 may be performed by a UE (as described below) or by some other entity. The UE may select at least one resource block from among a plurality of resource blocks reserved for transmission of proximity detection signals by UEs (block 1512). The UE may generate a proximity detection signal occupying the at least one resource block based on an OFDMA modulation technique (block 1514). The UE may transmit the proximity detection signal to indicate its presence and to enable other UEs to detect the UE (block 1516).

In one design of block 1514, the UE may generate a reference signal occupying a first set of resource elements in the at least one resource block (e.g., resource elements with label "$R_5$" in FIG. 7A or label "$R_4$" in FIG. 7B). The UE may generate the reference signal based on one of a set of reference signal sequences reserved for proximity detection signals. The UE may generate a data signal occupying a second set of resource elements in the at least one resource block (e.g., resource elements without any label or hashing in FIG. 7A or 7B).

In one design, the first set of resource elements for the reference signal may comprise first and second subsets of resource elements. The first subset of resource elements may occupy a first subset of subcarriers (e.g., subcarriers 3, 7 and 11 in FIG. 7A) in at least one symbol period. The second subset of resource elements may occupy a second subset of subcarriers (e.g., subcarriers 1, 5 and 9 in FIG. 7A) in at least one other symbol period. The UE may generate reference symbols based on a reference signal sequence, map a first subset of the reference symbols to the first subset of resource elements, and map a second subset of the reference symbols to the second subset of resource elements.

In one design, to generate the data signal, the UE may encode data to be sent in the proximity detection signal based on a coding scheme, map the encoded data to modulation symbols based on a modulation scheme, and map the modulation symbols to the second set of resource elements in the at least one resource block. The UE may generate a plurality of OFDMA symbols based on the mapped modulation symbols. The UE may generate the proximity detection signal for transmission on the PDSCH or PDCCH. The UE may generate the plurality of OFDMA symbols in different manners for the PDSCH and PDCCH, as described above.

Various features may be applicable for both process 1400 in FIG. 14 and process 1500 in FIG. 15. In one design, neighboring base stations may be allocated different pluralities of resource blocks for transmission of proximity detection signals by UEs within the coverage of these base stations. In one design, a UE may select at least one resource block from among a plurality of resource blocks allocated to a base station serving the UE, or a base station detected strongly by the UE, or a base station selected in some other manner.

In one design, a UE may generate a proximity detection signal occupying two resource blocks in two slots based on SC-FDMA or OFDMA modulation technique. The two resource blocks may cover the same set of subcarriers without frequency hopping or different sets of subcarriers with frequency hopping. The UE may also generate the proximity detection signal occupying only one resource block or more than two resource blocks.

In one design, a UE may transmit a proximity detection signal on an uplink spectrum. In other designs, the UE may transmit the proximity detection signal on a downlink spectrum (e.g., on a portion of a downlink frequency channel reserved for proximity detection signals), or on a dedicated spectrum for P2P communication, etc. In one design, the UE may transmit the proximity detection signal via a single antenna port. In other designs, the UE may transmit the proximity detection signal from multiple antenna ports (e.g., from two antenna ports or all antenna ports available at the UE).

Figure 16:
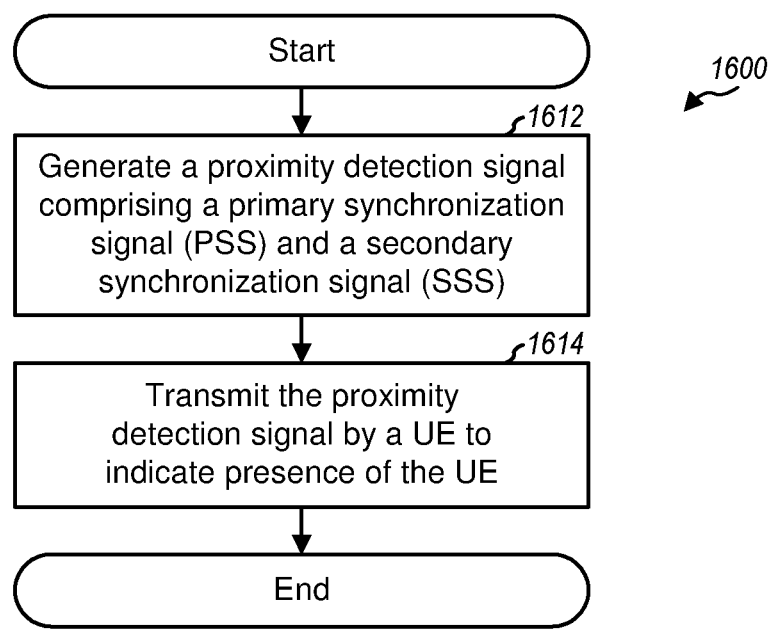
FIG. 16 shows a process for performing peer discovery based on synchronization signals.

FIG. 16 shows a design of a process 1600 for performing peer discovery based on synchronization signals used in a wireless network. Process 1600 may be performed by a UE (as described below) or by some other entity. The UE may generate a proximity detection signal comprising a PSS and a SSS (block 1612). The UE may transmit the proximity detection signal to indicate its presence (block 1614). The UE may generate and/or transmit the proximity detection signal such that the PSS and SSS in the proximity detection signal avoid collision with a PSS and a SSS transmitted by a base station in a wireless network. This may be achieved in various manners.

In one design, the UE may transmit the proximity detection signal at a center frequency that is not used for the PSS and SSS transmitted by the base station, e.g., a center frequency that is not one of the raster channel frequencies for the wireless network. In one design, the UE may select the center frequency from a set of center frequencies designated for transmission of proximity detection signals. In another design, the UE may transmit the PSS and SSS in a spectrum that is not used for the PSS and SSS transmitted by the base station. For example, the UE may transmit the PSS and SSS on an uplink spectrum or a dedicated spectrum for P2P communication.

In yet another design, the UE may transmit the PSS and SSS at different symbol locations. The UE may transmit the PSS at a first symbol location not used for transmitting the PSS by the base station and/or may transmit the SSS at a second symbol location not used for transmitting the SSS by the base station. In yet another design, the UE may transmit the PSS and SSS with different symbol spacing. The UE may transmit the PSS in the first symbol period and may transmit the SSS in the second symbol period. The spacing between the first and second symbol periods may be different from the spacing between symbol periods in which the PSS and SSS are transmitted by the base station.

In yet another design, the UE may use different scrambling for the SSS. The UE may scramble the SSS with a scrambling sequence that is not used for the SSS transmitted by the base station. The UE may also generate and/or transmit the PSS and SSS in other manners such that they are distinguishable from the PSS and SSS transmitted by the base station.

In one design, the UE may transmit a reference signal in a subframe in which the proximity detection signal is transmitted. The reference signal may be used by other UEs for AGC and also as a virtual CRC for the proximity detection signal. In another design, the UE may transmit an explicit CRC, e.g., in the PSS, the SSS, and/or a payload of the proximity detection signal.

In one design, the UE may determine symbol periods allocated to a particular base station (or a cell) with which the UE is associated. The allocated symbol periods may be designated for transmission of proximity detection signals by UEs associated with the particular base station. The UE may transmit the proximity detection signal in at least one symbol period among the symbol periods allocated to the particular base station. In another design, the UE may determine a frequency range allocated to the particular base station with which the UE is associated. The frequency range may be designated for transmission of proximity detection signals by UEs associated with the particular base station. The UE may transmit the proximity detection signal in the frequency range.

FIG. 17A shows a block diagram of a design of a UE 120x, which may be one of the UEs in FIG. 1. Within UE 120x, a receiver 1712 may receive P2P signals transmitted by other UEs for P2P communication and downlink signals transmitted by base stations for WAN communication. A transmitter 1714 may transmit P2P signals to other UEs for P2P communication and uplink signals to base stations for WAN communication. A module 1716 may detect proximity detection signals transmitted by other UEs for peer discovery. A module 1718 may generate a proximity detection signal for UE 120x based on any of the designs described above. Module 1718 may transmit the proximity detection signal for peer discovery.

A module 1720 may support network-assisted peer discovery and may perform P2P registration with directory agent 140, generate and send P2P requests, receive notifications, and initiate peer discovery in response to the notifications. A module 1722 may measure received signal strength of proximity detection signals from other UEs and reference signals from base stations. Module 1722 may generate pilot measurement reports comprising the received signal strengths of detected UEs and base stations of interest and may send the pilot measurement reports, e.g., to a serving base station. A module 1724 may support P2P communication, e.g., generate and process signals used for P2P communication. A module 1726 may support WAN communication, e.g., generate and process signals used for WAN communication. The various modules within UE 120x may operate as described above. A controller/processor 1728 may direct the operation of various modules within UE 120x. A memory 1730 may store data and program codes for UE 120x.

FIG. 17B shows a block diagram of a design of a base station 110x, which may be one of the base stations in FIG. 1. Within base station 110x, a receiver 1742 may receive uplink signals transmitted by UEs for WAN communication. A transmitter 1744 may transmit downlink signals to UEs for WAN communication. A module 1746 may receive pilot measurement reports from UEs. A scheduler 1748 may select P2P communication or WAN communication for UEs based on the pilot measurement reports and may assign resources to the scheduled UEs. A module 1750 may support WAN communication for UEs, e.g., generate and process signals used for WAN communication. A module 1752 may support communication with other network entities (e.g., other base stations, network controllers, directory agent 140, etc.) via the backhaul. The various modules within base station 110x may operate as described above. A controller/processor 1754 may direct the operation of various modules within base station 110x. A memory 1756 may store data and program codes for base station 110x.

FIG. 17C shows a block diagram of a directory agent 140x, which may be one design of directory agent 140 in FIG. 1. Within directory agent 140x, a module 1772 may perform P2P registration for UEs seeking assistance for peer discovery. A module 1774 may perform request matching to identify UEs that match other UEs. A module 1776 may send notifications to matched UEs. A module 1778 may support communication with other network entities (e.g., network controllers) via the backhaul. A controller/processor 1780 may direct the operation of various modules within directory agent 140x. A memory 1782 may store data and program codes for directory agent 140x.

The modules within UE 120x in FIG. 17A, base station 110x in FIG. 17B, and directory agent 140x in FIG. 17C may comprise processors, electronic UEs, hardware UEs, electronic components, logical circuits, memories, software codes, firmware codes, etc., or any combination thereof.

Figure 18:
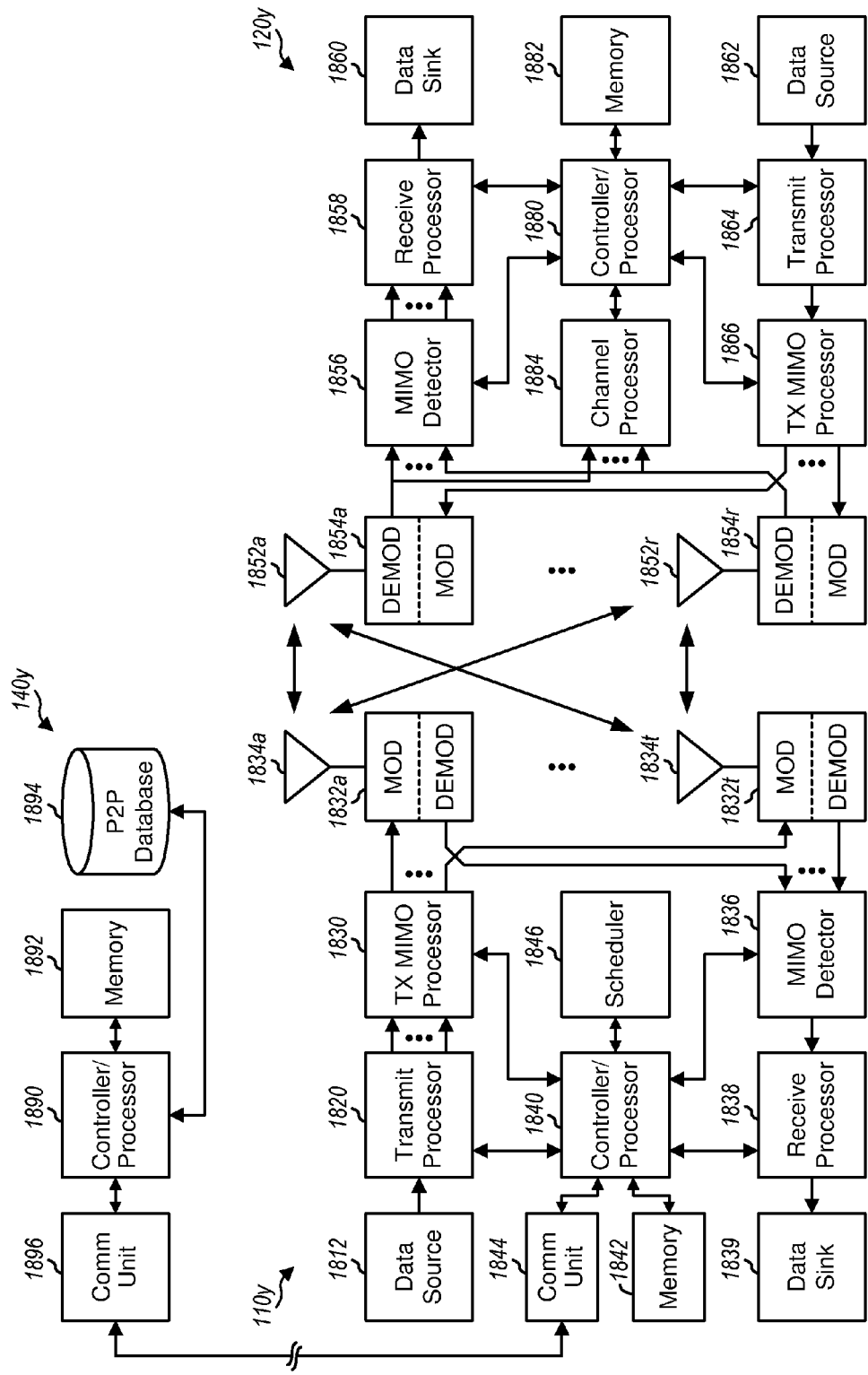
FIG. 18 shows a block diagram of another design of a UE, a base station, and a directory agent.

FIG. 18 shows a block diagram of a base station 110y, a UE 120y, and a directory agent 140y, which may be another design of a UE, a base station, and directory agent 140 in FIG. 1. Base station 110y may be equipped with T antennas 1834a through 1834t, and UE 120y may be equipped with R antennas 1852a through 1852r, where in general T≥1 and R≥1.

At base station 110y, a transmit processor 1820 may receive data from a data source 1812 and control information (e.g., messages supporting peer discovery) from a controller/processor 1840. Processor 1820 may process (e.g., encode and modulate) the data and control information to obtain data symbols and control symbols, respectively. Processor 1820 may also generate reference symbols for synchronization signals, reference signals, etc. A transmit (TX) multiple-input multiple-output (MIMO) processor 1830 may perform spatial processing (e.g., precoding) on the data symbols, the control symbols, and/or the reference symbols, if applicable, and may provide T output symbol streams to T modulators (MODs) 1832a through 1832t. Each modulator 1832 may process a respective output symbol stream (e.g., for OFDM, etc.) to obtain an output sample stream. Each modulator 1832 may further process (e.g., convert to analog, amplify, filter, and upconvert) the output sample stream to obtain a downlink signal. T downlink signals from modulators 1832a through 1832t may be transmitted via T antennas 1834a through 1834t, respectively.

At UE 120y, antennas 1852a through 1852r may receive the downlink signals from base station 110y, downlink signals from other base stations, and/or P2P signals from other UEs and may provide received signals to demodulators (DEMODs) 1854a through 1854r, respectively. Each demodulator 1854 may condition (e.g., filter, amplify, downconvert, and digitize) a respective received signal to obtain input samples. Each demodulator 1854 may further process the input samples (e.g., for OFDMA, etc.) to obtain received symbols. A MIMO detector 1856 may obtain received symbols from all R demodulators 1854a through 1854r, perform MIMO detection on the received symbols if applicable, and provide detected symbols. A receive processor 1858 may process (e.g., demodulate and decode) the detected symbols, provide decoded data for UE 120y to a data sink 1860, and provide decoded control information to a controller/processor 1880. A channel processor 1884 may detect proximity detection signals from other UEs and may measure the received signal strength of the detected proximity detection signals.

On the uplink, at UE 120y, a transmit processor 1864 may receive data from a data source 1862 and control information (e.g., messages for peer discovery) from controller/processor 1880. Processor 1864 may process (e.g., encode and modulate) the data and control information to obtain data symbols and control symbols, respectively. Processor 1864 may also generate reference symbols for reference signals. Processor 1864 may also generate a proximity detection signal based on any of the designs described above. The symbols from transmit processor 1864 may be precoded by a TX MIMO processor 1866 if applicable, further processed by modulators 1854a through 1854r (e.g., for SC-FDMA, OFDMA, etc.), and transmitted to base station 110y, other base stations, and/or other UEs. At base station 110y, the uplink signals from UE 120y and other UEs may be received by antennas 1834, processed by demodulators 1832, detected by a MIMO detector 1836 if applicable, and further processed by a receive processor 1838 to obtain decoded data and control information sent by UE 120y and other UEs. Processor 1838 may provide the decoded data to a data sink 1839 and the decoded control information to controller/processor 1840.

Controllers/processors 1840 and 1880 may direct the operation at base station 110y and UE 120y, respectively. Processor 1880 and/or other processors and modules at UE 120y may perform or direct process 1400 in FIG. 14, process 1500 in FIG. 15, process 1600 in FIG. 16, and/or other processes for the techniques described herein. Memories 1842 and 1882 may store data and program codes for base station 110y and UE 120y, respectively. A communication (Comm) unit 1844 may enable base station 110y to communicate with other network entities. A scheduler 1846 may schedule UEs for WAN communication and P2P communication and may assign resources to the scheduled UEs.

Within directory agent 140y, a controller/processor 1890 may perform various functions to support peer discovery. Controller/processor 1890 may perform P2P registration for UEs, receive P2P requests from UEs, perform request matching, and provide notifications to initiate peer discovery by matched UEs. A memory 1892 may store program codes and data for directory agent 140y. A storage unit 1894 may store information for UEs that have registered with the directory agent, P2P requests from the UEs, etc. A communication unit 1896 may enable the directory agent to communicate with other network entities.

In one configuration, apparatus 120x or 120y for wireless communication may include means for selecting at least one resource block from among a plurality of resource blocks reserved for transmission of proximity detection signals by UEs, means for generating a proximity detection signal occupying the at least one resource block based on a SC-FDMA modulation technique, and means for transmitting the proximity detection signal by a UE to indicate presence of the UE.

In another configuration, apparatus 120x or 120y for wireless communication may include means for selecting at least one resource block from among a plurality of resource blocks reserved for transmission of proximity detection signals by UEs, means for generating a proximity detection signal occupying the at least one resource block based on an OFDMA modulation technique, and means for transmitting the proximity detection signal by a UE to indicate presence of the UE.

In yet another configuration, apparatus 120x or 120y for wireless communication may include means for generating a proximity detection signal comprising a PSS and a SSS, and means for transmitting the proximity detection signal by a UE to indicate presence of the UE.

In an aspect, the aforementioned means may be processor(s) 1864 and/or 1880 at UE 120y, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communication, comprising:
generating, at a user equipment (UE), a proximity detection signal comprising a primary synchronization signal (PSS) and a secondary synchronization signal (SSS); and
transmitting the proximity detection signal by the UE to indicate presence of the UE, wherein transmitting the proximity detection signal comprises transmitting the primary synchronization signal in the proximity detection signal in a first symbol period and the secondary synchronization signal in a second symbol period, wherein a spacing between the first and second symbol periods is different from a spacing between symbol periods in which primary and secondary synchronization signals are transmitted by a base station.

2. The method of claim 1, wherein the primary and secondary synchronization signals in the proximity detection signal avoid collision with primary and secondary synchronization signals transmitted by the base station in a wireless network.

3. The method of claim 1, wherein the transmitting the proximity detection signal comprises transmitting the proximity detection signal at a center frequency that is not used for primary and secondary synchronization signals transmitted by the base station.

4. The method of claim 3, further comprising:
selecting the center frequency from a set of center frequencies designated for transmission of proximity detection signals by UEs.

5. The method of claim 1, wherein the transmitting the proximity detection signal comprises
transmitting the primary synchronization signal in the proximity detection signal at a first symbol location not used for transmitting a primary synchronization signal by the base station, and
transmitting the secondary synchronization signal in the proximity detection signal at a second symbol location not used for transmitting a secondary synchronization signal by the base station.

6. The method of claim 1, wherein the generating the proximity detection signal comprises scrambling the secondary synchronization signal in the proximity detection signal with a scrambling sequence not used for a secondary synchronization signal transmitted by the base station.

7. The method of claim 1, wherein the transmitting the proximity detection signal comprises transmitting the proximity detection signal on an uplink spectrum.

8. The method of claim 1, further comprising:
transmitting a reference signal in a subframe in which the proximity detection signal is transmitted.

9. The method of claim 1, wherein the first and second symbol periods are determined from symbol periods allocated to the base station, the UE being associated with the base station, the allocated symbol periods being designated for transmission of proximity detection signals by UEs associated with the base station.

10. The method of claim 1, wherein the transmitting the proximity detection signal comprises
determining a frequency range allocated to the base station, the UE being associated with the base station, the frequency range being designated for transmission of proximity detection signals by UEs associated with the base station, and
transmitting the proximity detection signal in the frequency range.

11. A user equipment (UE) for wireless communication, comprising:
means for generating a proximity detection signal comprising a primary synchronization signal (PSS) and a secondary synchronization signal (SSS); and
means for transmitting the proximity detection signal from the UE to indicate presence of the UE, wherein transmitting the proximity detection signal comprises transmitting the primary synchronization signal in the proximity detection signal in a first symbol period and the secondary synchronization signal in a second symbol period, wherein a spacing between the first and second symbol periods is different from a spacing between symbol periods in which primary and secondary synchronization signals are transmitted by a base station.

12. The UE of claim 11, wherein the means for transmitting the proximity detection signal is configured to transmit the proximity detection signal at a center frequency that is not used for primary and secondary synchronization signals transmitted by the base station.

13. The UE of claim 11, wherein the means for transmitting the proximity detection signal is configured to transmit the primary synchronization signal in the proximity detection signal at a first symbol location not used for transmitting a primary synchronization signal by the base station, and transmit the secondary synchronization signal in the proximity detection signal at a second symbol location not used for transmitting a secondary synchronization signal by the base station.

14. The UE of claim 11, wherein the means for transmitting the proximity detection signal is configured to transmit the proximity detection signal on an uplink spectrum.

15. A user equipment (UE) for wireless communication, comprising:
at least one processor configured to:
generate a proximity detection signal comprising a primary synchronization signal (PSS) and a secondary synchronization signal (SSS), and
transmit the proximity detection signal from the UE to indicate presence of the UE, the at least one processor being further configured to transmit the primary synchronization signal in the proximity detection signal in a first symbol period and the secondary synchronization signal in a second symbol period, wherein a spacing between the first and second symbol periods is different from a spacing between symbol periods in which primary and secondary synchronization signals are transmitted by a base station.

16. The UE of claim 15, wherein the at least one processor is configured to transmit the proximity detection signal at a center frequency that is not used for primary and secondary synchronization signals transmitted by the base station.

17. The UE of claim 15, wherein the at least one processor is configured to transmit the primary synchronization signal in the proximity detection signal at a first symbol location not used for transmitting a primary synchronization signal by the base station, and to transmit the secondary synchronization signal in the proximity detection signal at a second symbol location not used for transmitting a secondary synchronization signal by the base station.

18. The UE of claim 15, wherein the at least one processor is configured to transmit the proximity detection signal on an uplink spectrum.

19. A computer program product, comprising:
a non-transitory computer-readable medium comprising:
code for causing at least one processor to generate, at a user equipment (UE), a proximity detection signal comprising a primary synchronization signal (PSS) and a secondary synchronization signal (SSS), and
code for causing the at least one processor to transmit the proximity detection signal from the UE to indicate presence of the UE, wherein the code for causing the at least one processor to transmit the proximity detection signal causes the at least one processor to transmit the primary synchronization signal in the proximity detection signal in a first symbol period and the secondary synchronization signal in a second symbol period, wherein a spacing between the first and second symbol periods is different from a spacing between symbol periods in which primary and secondary synchronization signals are transmitted by a base station.

* * * * *